INVENTOR.
WILLIAM R. SMITH-VANIZ, JR.
BY
Curtis, Morris & Safford
ATTORNEYS

INVENTOR.
WILLIAM R. SMITH-VANIZ, JR.
BY
Curtis, Morris & Safford
ATTORNEYS

INVENTOR.
WILLIAM R. SMITH-VANIZ, JR.
BY
Curtis, Morris & Safford
ATTORNEYS

INVENTOR.
WILLIAM R. SMITH-VANIZ, JR.
BY
Curtis, Morris & Safford
ATTORNEYS

Aug. 15, 1961 W. R. SMITH-VANIZ, JR 2,996,577

METHODS AND APPARATUS FOR AUTOMATIC CONVERSION OF INTERNATIONAL MORSE CODE SIGNALS TO TELEPRINTER CODE

Filed Dec. 13, 1955 15 Sheets-Sheet 6

INVENTOR.
WILLIAM R. SMITH-VANIZ, JR.
BY
Curtis, Morris & Safford
ATTORNEYS

INVENTOR.
WILLIAM R. SMITH-VANIZ, JR.
BY
Curtis, Morris & Safford
ATTORNEYS

INVENTOR.
WILLIAM R. SMITH-VANIZ, JR.
BY
Curtis, Morris & Safford.
ATTORNEYS

INVENTOR.
WILLIAM R. SMITH-VANIZ, JR.
BY
Curtis Morris & Safford
ATTORNEYS

INVENTOR.
WILLIAM R. SMITH-VANIZ, JR.
BY
Curtis, Morris & Safford
ATTORNEYS

Aug. 15, 1961 W. R. SMITH-VANIZ, JR 2,996,577

METHODS AND APPARATUS FOR AUTOMATIC CONVERSION OF INTERNATIONAL MORSE CODE SIGNALS TO TELEPRINTER CODE

Filed Dec. 13, 1955 15 Sheets-Sheet 13

Aug. 15, 1961 W. R. SMITH-VANIZ, JR 2,996,577

METHODS AND APPARATUS FOR AUTOMATIC CONVERSION OF INTERNATIONAL MORSE CODE SIGNALS TO TELEPRINTER CODE

Filed Dec. 13, 1955 15 Sheets-Sheet 14

Aug. 15, 1961 W. R. SMITH-VANIZ, JR 2,996,577

METHODS AND APPARATUS FOR AUTOMATIC CONVERSION OF INTERNATIONAL MORSE CODE SIGNALS TO TELEPRINTER CODE

Filed Dec. 13, 1955 15 Sheets-Sheet 15

United States Patent Office 2,996,577

Patented Aug. 15, 1961

2,996,577

METHODS AND APPARATUS FOR AUTOMATIC CONVERSION OF INTERNATIONAL MORSE CODE SIGNALS TO TELEPRINTER CODE

William R. Smith-Vaniz, Jr., Norwalk, Conn., assignor to C.G.S. Laboratories, Inc., Stamford, Conn.

Filed Dec. 13, 1955, Ser. No. 552,902

56 Claims. (Cl. 178—26)

The present invention is in the communication field and relates particularly to method and apparatus for automatic conversion of International Morse Code signals into standard teleprinter code signals suitable for transmission over teleprinter lines and suitable for operating standard teletypewriters. The methods and apparatus described herein as embodying the invention automatically convert sequentially received Morse code signals for example, from a radio receiver, a tape scanner, or a transmission line, into teleprinter code signals, thus enabling the immediate production of printed page copy without a human operator.

Among the many advantages of the methods and apparatus described herein are those resulting from the following facts. The circuit apparatus described establishes its own criteria from the incoming Morse signals and follows changes in code speed from 10 to several hundred words per minute without adjustment, automatically converting the Morse signals into teleprinter code.

Whenever a Morse character is received that requires the teleprinter carriage to be shifted into its "upper case" position the apparatus described automatically generates a teleprinter shift signal and feeds this shift signal into the teleprinter circuits ahead of the converted Morse signal.

In order to make page copy, with an appropriate right hand margin, counter circuits automatically count the number of characters and spaces in each line, until a predetermined number is reached, for example, until a count of 64 is reached. At the next word ending after this predetermined number is reached, a carriage return signal and a signal for shifting the paper to the next line are automatically generated and fed into the teleprinter circuits. If no word ending occurs within a given number of characters after this predetermined number has been passed, the word is broken and the carriage returned and paper shifted so as to complete the word on the next line at the left margin.

Standard teleprinter circuits are operated by code groups, each consisting of a unique arrangement of five code pulses and preceded by a "start" space and followed by a "stop" mark. Each teleprinter character requires the same time for transmission. A standard teletypewriter is arranged to differentiate between the positions and numbers of the pulses within each electrical character and then prints the letter or number corresponding to this electrical character. Special characters are transmitted to control the operation of the teleprinter, such as carriage shift, line feed, and carriage return.

However, the characters of International Morse Code are made up of combinations of short pulses (dots) and longer pulses (dashes). A dash has a time duration approximately three times that of a dot. Moreover, the time duration of the different kinds of spaces varies. The spaces between the dots and dashes of a character have the same duration as the dots; those between characters have the same duration as dashes, and those between words have a duration about seven times the length of a dot. Characters in Morse code require widely different lengths of time for transmission; they may consist of a single dot or combinations of as many as six dots and dashes, while all teleprinter code signals require exactly the same time for transmission. Moreover, the Morse code signals include no code characters for controlling the operation of a teleprinter.

It is among the many advantages of the methods and apparatus described that they provide automatic storage to take care of the difference in transmission time between the different Morse characters while feeding the teleprinter signals out at a constant rate, and to enable the generation of the necessary control signals for feeding the paper, shifting and returning the carriage, etc. In addition, the average speed of transmission of Morse signals may be increased or decreased during transmission, and these changes in speed are automatically compensated for.

In operation, the apparatus described can be connected to any source of keyed Morse code, for example, such as a radio receiver, transmission line, or tape scanner. The apparatus "listens to" the first few dots and dashes being received to determine the speed of the Morse code, and then begins to classify the incoming marks as dots or dashes. It also recognizes and classifies the spaces occurring between the mark as element spaces, (i.e., spaces between dots and dashes of a single character) letter spaces, (i.e., spaces between letters) or word spaces (spaces between words).

After recognition, the elements of each incoming character are stored in a one-character storage circuit from which the signals, each corresponding to one element of the stored character, are fed simultaneously into a conversion matrix. This conversion matrix produces a group of simultaneous signals corresponding to the desired teleprinter code. This transformed information is stored in a memory, having capacity for several characters, and "read out" as a series of sequential marks and spaces at a uniform speed suitable for operation of a conventional teleprinter.

The apparatus described also provides all other signals necessary for operation of the teleprinter to produce page copy. Thus, each space between successive words of the Morse code results in the generation of the appropriate teleprinter space character. Also, characters which require the carriage of the teleprinter to be shifted from lower to upper case or upper to lower case are held in the memory circuits while the appropriate carriage-shift signals are generated and fed into the teleprinter ahead of the character to be printed.

At the end of each line, appropriate carriage return and paper feed signals are generated and fed into the teleprinter. The carriage return signal is arranged to occur whenever possible at the end of a word, so that with the exception of the occurrence of long words at the end of a line, each line ends at the end of a word.

Whenever an erroneous Morse code signal is received, that is, one for which there is no corresponding teleprinter signal, the apparatus is arranged to generate a particular teleprinter signal designed to indicate the reception of an unrecognizable character.

Among the many advantages of the method and apparatus of the present invention are that they enable the reception of Morse code at one speed and the transmission of the corresponding teletypewriter signals at a different speed. Moreover, the method and apparatus enable the recognition of changes in the speed at which the Morse code signals are being received and correspondingly automatically changes the speed of transmission of the teleprinter characters. Moreover, with this method and apparatus the rate of reception of the signals of the Morse code can change, and yet these changes are all recognized and accordingly the speed of the transmission of the teleprinter characters is correspondingly changed.

The magnitude of the problems overcome by the methods and apparatus described will be appreciated even further when it is realized that the length of a "dash" during fast transmission may be the same length as or less than the length of a "dot" during transmission at a slower rate, and yet there are automatically and correctly recognized.

The various objects, aspects, and advantages of the present invention will be more fully understood from a consideration of the following description in conjunction with the accompanying drawings, in which:

FIGURES 1A, 1B, 1C, 1D, 1E, and 1F form a schematic circuit diagram illustrating in block form methods and apparatus embodying the present invention. To facilitate following this description it is suggested that the drawings be separated from the description and fitted together. FIGURES 1A–1F are arranged as follows:

GENERAL DESCRIPTION OF METHODS AND APPARATUS EMBODYING THE PRESENT INVENTION

In the notation used in this description, any signal indicated by a letter without a prime sign will be understood to be a signal in which the pulses "go" in the negative direction during an incoming mark or to produce the particular function desired. Positive voltages which remain positive but drop to a lower magnitude to produce a pulse are considered as "going" in the "negative" direction. The presence of a prime sign indicates that the pulses in the particular signal go in the positive direction during an incoming mark or to produce the desired function.

Figure 1A:
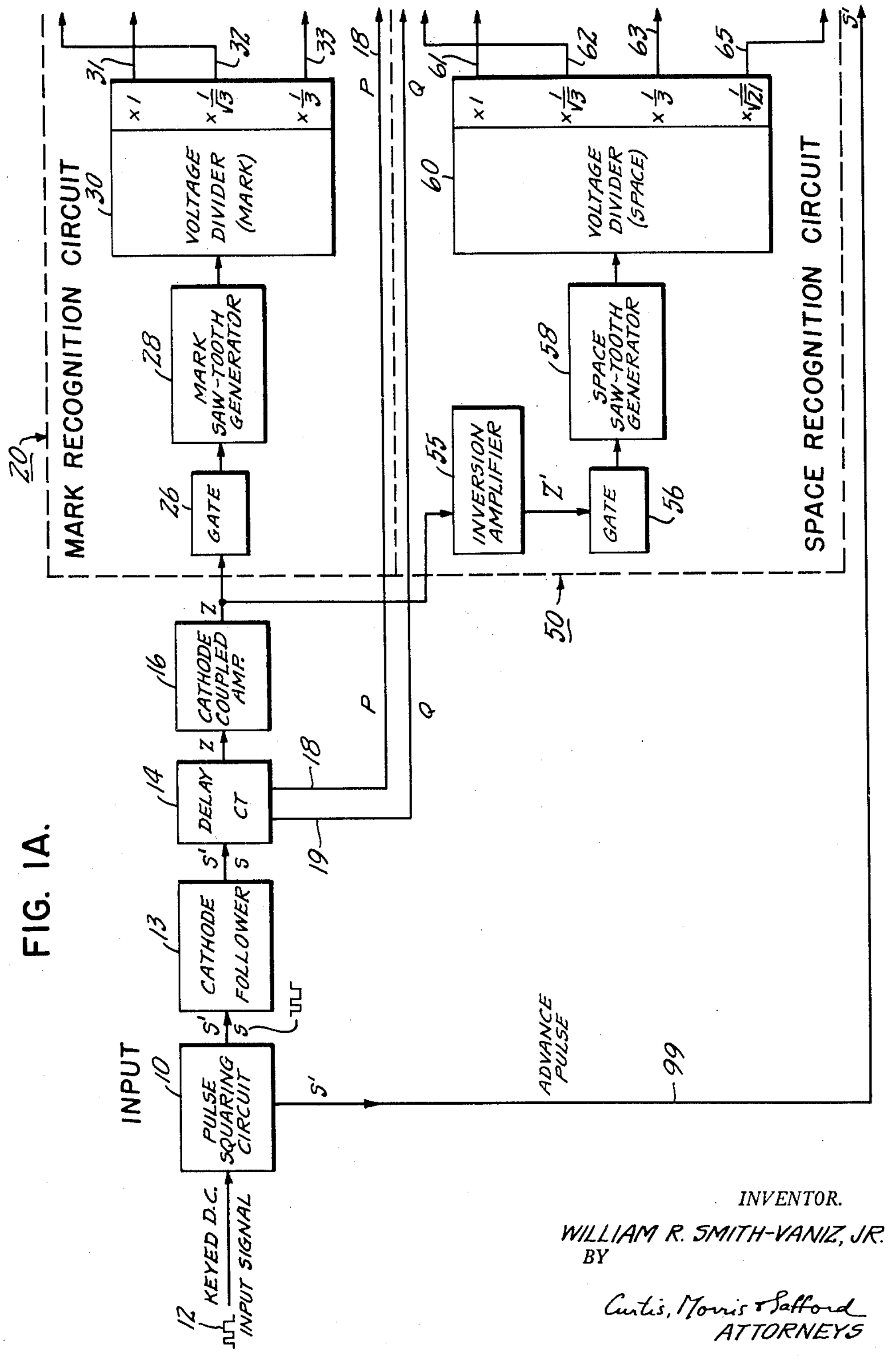
FIGURES 1A, 1B, 1C and 1E are arranged in a horizontal row end-to-end from left to right in that order, as shown in FIGURE 3, with FIGURE 1D being placed above FIGURE 1C and FIGURE 1F being placed above 1E.
Figure 1B:
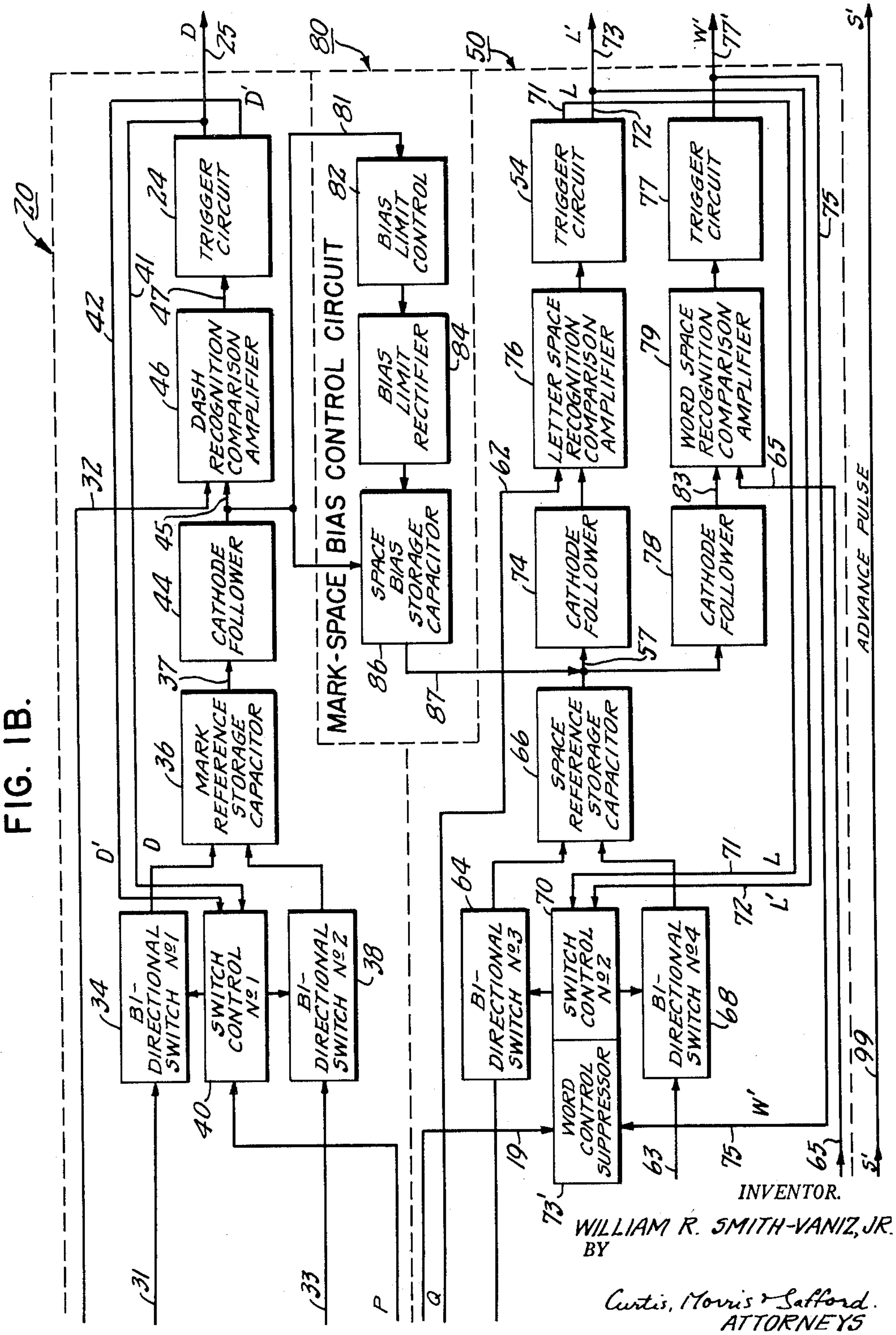

As shown in FIGURE 1A, the Morse code signals 12 are fed into an input circuit 10, shown as a pulse squaring circuit. These Morse signals are derived from some suitable source such as a radio receiver or a transmission line and are in the form of keyed direct current pulses, the shorter pulses being "dots" and the longer pulses being "dashes." As will be explained in connection with FIGURE 2, these input signals may be either positive or negative pulses, a separate input connection being provided for either polarity. As illustrated, the Morse signal 12 which is to be converted is in the form of positive-going pulses. A dash followed by a dot is illustrated.

The purpose of the pulse squaring circuit 10 is to regenerate the incoming signal and to produce sharp pulses of equal amplitude. This circuit is of help in circumstances where the incoming signal is distorted, for example, as a result of being transmitted over a long line, or where there is excessive variation in the pulses, for example, as a result of "fading" during radio transmission.

This input circuit 10 generates a regenerated signal S, which is of negative polarity, and also a regenerated signal S′ corresponding in polarity with the input signal 12. The signal S′ provides advance pulses which are used to produce successive advances in the positions of the stored character elements as the successive dots and dashes in each Morse character are received, and is described in detail further below.

The signal S is fed through suitable isolating means, shown as a cathode follower 13, delayed for about 1 millisecond by a delay circuit 14, and fed through a cathode-coupled amplifier stage 16. The resulting delayed signal is indicated by Z and is substantially identical with S except that it lags behind S by 1 millisecond.

In the delay circuit 14, a pair of control pulses P and Q are generated both of which are 1 millisecond in length and which are fed over the leads 18 and 19, respectively, in order to control the operations of certain bi-directional switches described later.

The pulses P occur at the beginning of each "space" in the received signal, that is, whenever a "mark" (i.e., "dot" or "dash") has just ended. The pulses Q occur at the beginning of each mark.

*Recognition of dots and dashes*

In order to recognize whether each incoming mark in the Morse message is a dot or a dash, independently of the code speed, the delayed signal Z from the cathode-coupled amplifier 16 is fed into a mark recognition circuit, shown within the broken line 20. This circuit measures the length of each mark by generating a voltage whose magnitude changes in a known manner for the duration of the mark. Thus, the voltage at the termination of the mark is a measure of the time duration of the mark. In this embodiment of the invention, the generation of a saw-tooth voltage is initiated by each incoming mark, whether it be a dot or a dash. At the end of each mark the amplitude of the corresponding saw-tooth voltage is measured. Thus, a voltage is created whose magnitude is a function of the length of the mark.

In order to distinguish dashes from dots, the amplitude of the saw-tooth voltage occurring at the end of each mark is compared with a stored reference voltage derived from previously received marks. Successive saw-tooth voltages are compared with this reference voltage, and are also used to modify it in accordance with changes in the speed of the message. In effect, the reference voltage is a criterion established from the average value of the mean lengths of the dots and dashes just previously received.

When an incoming mark lasts sufficiently long that a predetermined portion of the amplitude of its saw-tooth voltage rises to the value of this reference voltage, it is recognized as being a dash. Shorter marks are recognized as dots.

Among the advantages of this arrangement is the fact that as the speed of the message being received changes, the reference voltage changes in accordance with the changes in the length of the dots and dashes being received. Thus, recognition of dots and dashes is made automatically without manual adjustment, even though the speed of the message being received changes over a wide range.

Advantageously, because dashes are generally three times as long as dots, when an incoming mark is recognized as being a dash, only one-third of the value of its corresponding saw-tooth voltage is used to derive the reference voltage. When the incoming mark is recognized as a dot, the full value of its corresponding saw-tooth voltage is used to derive the reference voltage. In this way the reference voltage is always established at an average value which is the most effective criterion for distinguishing dashes from dots.

When an incoming mark has been recognized as being a dash, a pair of pulses D and D′ are supplied on a pair of leads 41 and 42, respectively, and the pulse D is also supplied on a lead 25 from a pulse squaring trigger circuit 24 in the output of the mark recognition circuit 20. These pulses D and D′ are called "dash decision" pulses and are initiated at the instant that a predetermined portion (which is herein shown as $1/\sqrt{3}$ of the saw-tooth voltage rises above the reference voltage (i.e. at the instant that that incoming mark is recognized as being a dash). Both D and D′ last until the end of the dash. The absence of the pair of pulses D and D′ from the output 24, when a mark is being received, means that the mark is recognized as being a dot.

The operation of the dot-dash recognition (mark recognition) circuit 20 will now be considered in greater detail. The delayed input signal Z is fed through a gate circuit 26 into the mark saw-tooth generator 28 which is triggered by the beginning of each mark and starts to generate a saw-tooth voltage. In the voltage divider 30 this saw-tooth voltage is divided into three different values and fed into the three paths 31, 32 and 33. Through the upper path 31, the full amplitude of this saw-tooth voltage is applied to a first bi-directional switch 34 whose output is connected to a mark reference storage capacitor 36. Through the lowest path 33, one-third of this saw-tooth voltage is fed to a second bi-directional switch 38 whose output is also connected to the storage circuit 36. When the incoming mark has been recognized as a dash, the lower switch 38 is actuated, i.e., rendered conductive so that ⅓ of the saw-tooth voltage is fed to the storage circuit 36 to establish the reference voltage. The other switch 34 is actuated when the incoming mark is a dot, so that the full saw-tooth voltage is then applied to the storage circuit 36 to establish the reference voltage.

In order to open the proper one of these switches 34 or 38 at the end of each mark, the pulses P in the lead 18 operate a switch control 40 connected to both bi-directional switches. The control 40 determines which switch to actuate in response to the signals D and D′ in the leads 41 and 42 from the pulse squaring trigger circuit 24. When the pulses D and D′ are present in the leads 41 and 42, i.e., a dash decision has been made, the control 40 opens the switch 38. Otherwise, the bi-directional switch 34 is actuated, for the incoming mark is recognized as being a dot.

In order to determine whether the incoming mark is a dot or dash, the voltage from the mark reference storage capacitor 36 is fed through a cathode follower 44 and by a lead 45 into a dash recognition comparison amplifier 46. This voltage on the lead 45 is compared with the voltage on the lead 32 which is $1/\sqrt{3}$ (i.e., .577) of the rising voltage from the saw-tooth generator 28. For most applications, the use of this geometric mean between 1 and ⅓ provides the most sensitive and selective value for distinguishing dots from dashes. Whenever .577 of the saw-tooth voltage becomes larger than the voltage stored in the circuit 36, the comparison amplifier 46 triggers the pulse squaring circuit 24 to generate the dash decision pulses D and D′.

The reason why the delay circuit 14 is used will now be understood. During the brief period of the delay, the end-of-mark pulse P on the lead 18 actuates the switch control 40 to actuate the appropriate bi-direction switch so as to connect the storage circuit 36 with either 1 or ⅓ of the peak value of the saw-tooth voltage produced by the mark saw-tooth generator 28 at the end of each mark. Also, since this pulse P occurs at the end of each incoming mark, the decision as to whether or not the mark is a dash has already been made, and thus the control circuit 40 is in proper condition to select the appropriate switch 34 or 38. Thereafter the end of the mark appears in the delayed signal. This then triggers the gate 26 so as to discharge the saw-tooth generator circuit 28 and shut it off until the beginning of the next mark appears in the delayed signal, which again actuates the gate 26 and starts the generation of a new saw-tooth voltage.

*Recognition of letters and words:*

A space recognition circuit, shown within the broken line 50, distinguishes the three kinds of spaces. This space recognition circuit 50 is similar to the mark recognition circuit 20. One difference is that in circuit 20 most of the operations occur at the end of each mark, after the decision has been made as to whether or not a dash is being received. In the space recognition circuit 50, most of the operations occur at the end of each space, after a decision has been made as to what type of space is being received, that is, whether the space is:

(1) an element space (a space occurring between the marks of a Morse character), (2) the longer letter space, (at the end of a complete Morse character), or (3) the still longer word space, (after a group of Morse characters).

When a space has been distinguished as a letter space, a pulse squaring trigger circuit 54 produces a pair of pulses L and L′ on the leads 71 and 72, respectively, and also a pulse L′ on a lead 73, indicating that a letter decision has been made. A pulse squaring trigger circuit 77 produces a word decision pulse W′ when the space has been distinguished as being too long to be a letter space. The absence of both the letter decision pulses L and L′ and word decision pulse W′ indicates that the incoming space has been recognized as an element space.

Voltages are derived from the space saw-tooth generator 58, which is controlled by the delayed signals Z from the cathode-coupled amplifier 16 which are fed through an inversion amplifier stage 55. The inverted signals Z′ are fed through a gate 56 and initiate the generation of a saw-tooth voltage at the start of each delayed space. The saw-tooth voltages from the generator 58 are compared with a reference voltage established in a space reference storage capacitor 66 to distinguish letter and word spaces.

Because relatively long periods of time may elapse between successive words, either because of irregularities in the transmission or because the transmission may be interrupted from time to time, it is an advantage of this circuit that the saw-tooth voltage from the space saw-tooth generator 58 is prevented from affecting the space reference voltage when word spaces are received. Thus, the space reference voltage is not distorted by variations in the lengths of word spaces.

This function of preventing word spaces from affecting the space reference voltage accounts for another difference between the mark and space recognition circuits 20 and 50. The word decision pulses W′ are fed over a line 75 into a word control suppressor 73′ which prevents the switch control 70 from actuating either of the bi-directional switches 64 and 68 whenever a word space decision has been made.

In order to determine when a word space is present, the voltage divider 60 feeds a small fractional value, namely $1/\sqrt{21}$ (i.e., .218) of the saw-tooth voltage from the space saw-tooth generator 58 over a lead 65 to a word space recognition comparison amplifier 79 which is also connected by a lead 83 and by a cathode follower 78 to the space reference capacitor 66 and by a lead 87 to a space bias storage capacitor 86 and to the cathode of a diode 84. The voltage on the anode of diode 84 limits the minimum effective value of the space reference voltage in accordance with the lengths of the marks being received, for reasons explained next.

In Morse code messages which are decreasing rapidly in speed, the letter spaces and element spaces rapidly become longer. In cases of very sudden decreases in speed, it is possible that the circuit 50 might begin to "recognize" letter spaces or element spaces as being word spaces, in which case the word control suppressor 73 would operate to prevent any change in the reference voltage being stored in the storage circuit 66. The result would be that the circuit 50 would, in effect, become "stuck" in operation, recognizing all spaces as word spaces.

In order to prevent the circuit 50 from confusing other spaces with word spaces during and following rapid decreases in the speed of the received message, the minimum effective reference voltage from the storage circuit 66 is limited in accordance with the lengths of the marks being received. This extra control is obtained by a mark-space bias control circuit 80, which prevents the voltage on the lead 77 at the output of the space reference storage circuit 66 from dropping below a predetermined fraction of the reference voltage in the mark recognition circuit 26. This mark-space bias control circuit 80 includes a bias limit control 82, a space bias limit rectifier 84, and the space bias storage capacitor 86. The setting of the control 82 establishes the desired minimum bias level, that is, the desired minimum length of a space that can be "recognized" as a word space. For usual operating conditions the control 82 is adjusted to prevent the voltage on the lead 77 from dropping below a voltage which would be obtained if the letter spaces were two-thirds as long as the dashes.

*Single character Morse storage circuit*

Figure 1C:
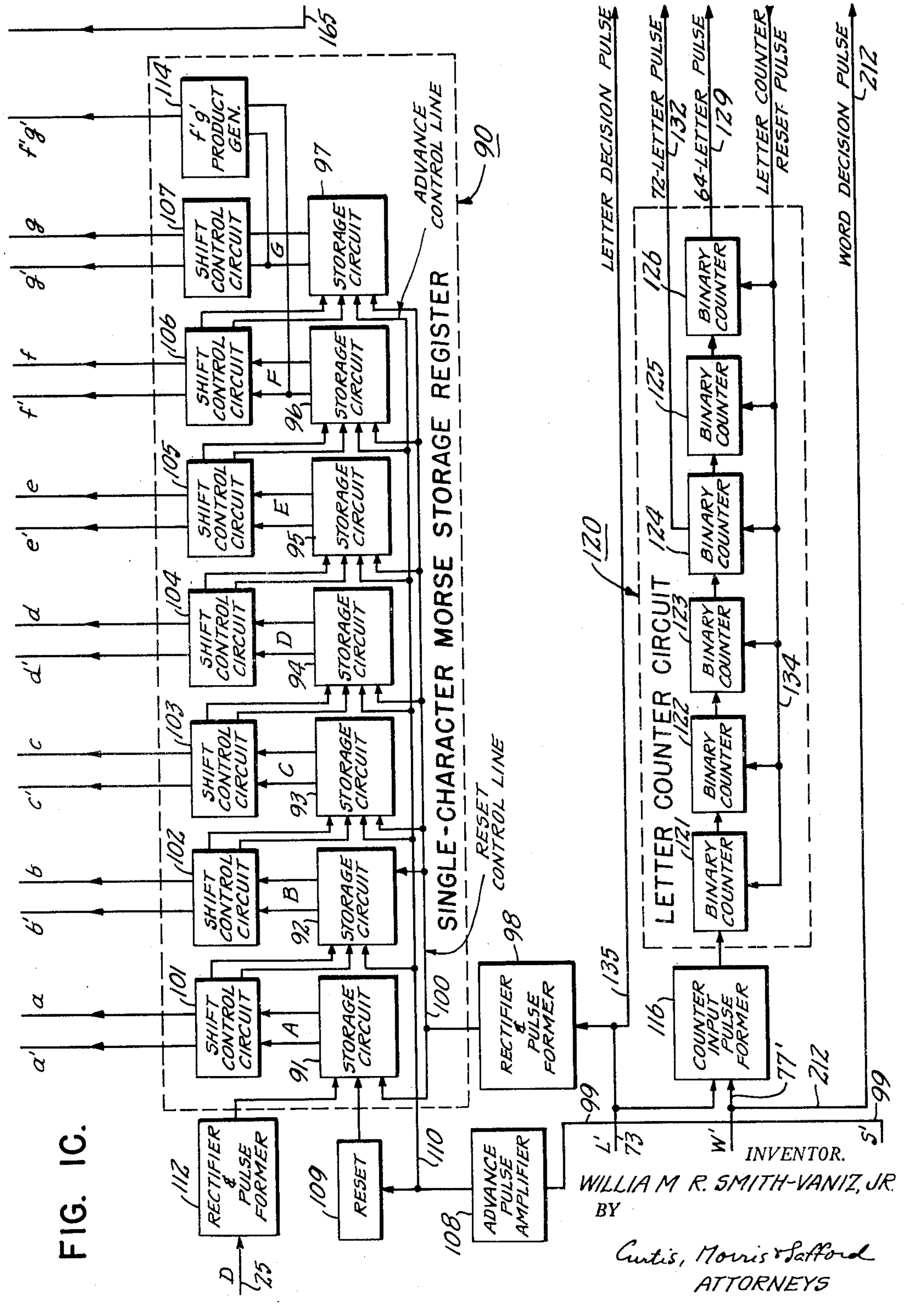
Figure 4:
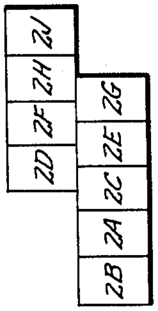

To store the dots and dashes of each Morse character, a single-character Morse storage shift register 90 (FIGURE 1C) is used. This is a seven digit binary register having seven rows A, B, C, D, E, F, and G including seven binary storage circuits 91–97, respectively, interconnecting with seven shift control circuits 101–107, respectively. Each of the storage circuits, 91–97 is adapted to be in either a "0" or a "1" condition and through its associated shift control circuit has two outputs *a*, *a'*; *b*, *b'*; *c*, *c'*; etc. When any storage circuit, for example, the circuit 91, is in the "0" condition, the voltage appearing at the output indicated with a letter followed by a prime sign is at a higher positive voltage than the voltage at the companion output indicated by an unprimed letter. When a "1" condition is present, the relative voltages at these pairs of output leads are reversed. A dot is represented by a "0" condition; a dash by a "1" condition.

At the end of each letter-decision pulse L' appearing on the lead 73, a pulse is formed in a rectifier and pulse former circuit 98 and fed through a Morse reset line 100 into all of the storage circuits 91–97 to reset them all back to zero, except for the second storage row B. The reset line 100 is connected to the opposite side of the second storage circuit 92 so that it is always reset to "1." The reason for this "1" in the second storage circuit is to enable the recognition of Morse characters which include dots as the first mark.

The regenerated signal S' from the input circuit 10 is fed over a lead 99 into an advance pulse amplifier 108. At the beginning of each mark the amplifier 108 feeds a sharp negative pulse over an advance line 110 connected to all of the storage circuits except the first. This serves to advance or shift the "0's" or "1's" in each storage circuit into the next successive circuit. At the same time the amplifier 108 feeds a negative pulse into a reset circuit 109, which resets the first storage circuit 91 to "0."

An advantageous result of the action of the delay circuit 14 is that the end of the letter decision pulse L' occurs after the first advance pulse has energized the advance line 110. When the end of the letter decision pulse L' occurs, the trailing edge of this pulse L' actuates the rectifier and pulse former circuit 98, so as to feed a negative pulse to the reset control line 100. Thus, the storage register 90 is reset to the desired initial condition, with a "0" in the first storage circuit, with a "1" in the second storage circuit, and with "0's" in all of the rest. As a result, the first advance pulse derived from the first mark of each new Morse character does not have any permanent effect upon Morse characters being stored in the register. This is the reason why the second storage circuit 92 is the one which is always reset to "1." In effect, this first "1" indicates the front of the new Morse character being fed into the register.

If the first mark is recognized as a dash, a dash decision pulse D is fed by a lead 25 into a rectifier and pulse former circuit 112 which generates a pulse and sets the first storage circuit 91 to "1" condition. If the first mark is a dot then the first storage circuit remains in its "0" condition. At the beginning of the next mark the reset amplifier and differentiator circuit 108 resets the first storage circuit 91 back to "0" and advances all of the stored marks to the next respective succeeding circuits. As the identity of each successive mark is determined it is stored in the first storage circuit 91 and then later on is advanced to the next circuit 92 when all of the previously stored marks are advanced, and so on. For example, assume that the Morse letter D (dash, dot, dot) is being received. The Morse storage register passes through the following conditions.

| | 91 | 92 | 93 | 94 | 95 | 96 | 97 |
|---|---|---|---|---|---|---|---|
| After beginning of first mark (after letter decision pulse from preceding Morse character has ended) | 0 | 1 | 0 | 0 | 0 | 0 | 0 |
| Upon recognition of the dash | 1 | 1 | 0 | 0 | 0 | 0 | 0 |
| At beginning of second mark | 0 | 1 | 1 | 0 | 0 | 0 | 0 |
| At beginning and end of third mark | 0 | 0 | 1 | 1 | 0 | 0 | 0 |

Other examples of how the Morse shift register appears after receiving different Morse characters are:

| | Storage Circuits | | | | | | |
|---|---|---|---|---|---|---|---|
| | 91 | 92 | 93 | 94 | 95 | 96 | 97 |
| E (dot) | 0 | 1 | 0 | 0 | 0 | 0 | 0 |
| J (dot, dash, dash, dash) | 1 | 1 | 1 | 0 | 1 | 0 | 0 |
| . (dot, dash, dot, dash, dot, dash) | 1 | 0 | 1 | 0 | 1 | 0 | 1 |
| F (dot, dot, dash, dot) | 0 | 1 | 0 | 0 | 1 | 0 | 0 |
| H (dot, dot, dot, dot) | 0 | 0 | 0 | 0 | 1 | 0 | 0 |

An *f'g'* product generator 114 is connected from the storage circuits 96 and 97 to the Morse to teleprinter conversion matrix 140 in order to generate a product of the signals *f'* and *g'*. When both of the storage circuits 96 and 97 are in the "1" condition this product is "1," otherwise it is "0." It is an advantage to generate this product *f'g'* in the separate generator 114 rather than to generate it in the matrix 140 itself because this product is used numerous times in the operation of the matrix and its external generation reduces the complexity of the matrix.

Before the register 90 is reset by the cessation of the letter decision pulse L', the conversion from Morse to teleprinter code is made in the matrix and the output fed through memory input circuits indicated within the broken line 150 into magnetic memory circuits 200.

*Conversion matrix*

Figure 1D:
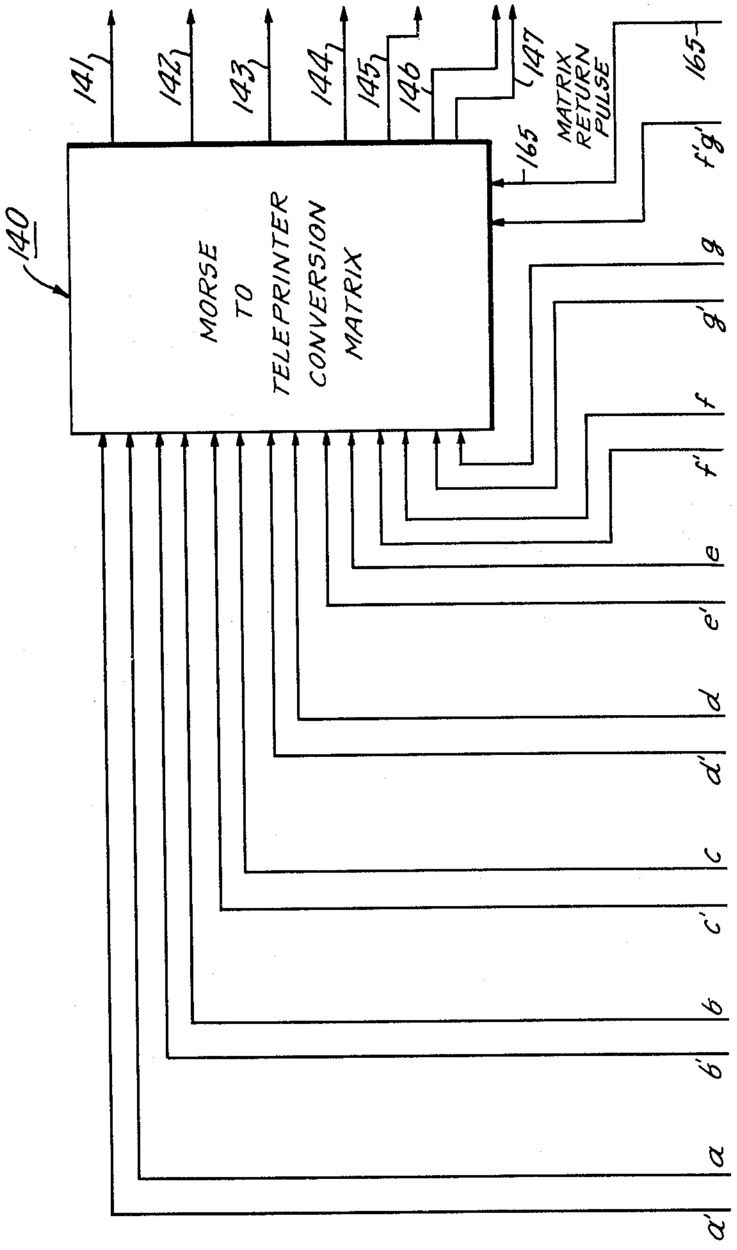
Figure 3:
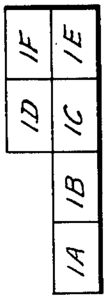

The outputs *a'*, *a*; *b'*, *b*; *c'*, *c*; *d'*, *d*; *e' e*; *f' f*; and *g' g*; from the shift control circuits 101–107 correspond with the outputs from the respective storage circuits 91–97 and are fed simultaneously into a Morse to teleprinter conversion matrix circuit 140 (FIGURE 1D) which has the function of converting the seven digit binary code from the Morse register into a simultaneous five-digit teleprinter code in a form suitable for generating the corresponding teleprinter characters. The matrix output appears on the five output leads 141, 142, 143, 144 and 145. A sixth output 146 from the matrix indicates whether the signal to be transmitted corresponds to a lower case or an upper case character in the teleprinter code. A seventh matrix output 147 indicates the reception of special Morse characters such as: $\overline{\text{AR}}$, $\overline{\text{BT}}$, and $\overline{\text{SK}}$, meaning end of transmission, paragraph, etc. and serves to return the carriage and operate the line feed to advance the sheet in the teleprinter to the next line.

*Automatic carriage return control*

The Morse message will not, of course, contain any information to indicate when the teletypewriter carriage should be returned. For this reason a letter-counter circuit 120 is used. This is a six-digit binary counter which counts up to 64 and also to 72 and includes six binary counter circuits 121–127, respectively.

In order to count each letter and also the spaces between words, the letter decision pulses L' and the word decision pulses W′ are fed into a counter input pulse former 116 which operates the letter counter circuit 120. The carriage of the standard teleprinter is normally returned to the left-hand margin at the completion of a word after sixty-four letters and spaces have been printed. The output lead 129 from the counter 126 carries a control signal after a total of sixty-four letters and word spaces have occurred which sets the memory input control circuit 150 (FIGURES 1E and 1F) to return the carriage at the end of the word being received as explained later.

The teleprinter has a capacity of only seventy-two per line so the carriage must be returned after this count is reached, regardless of whether the end of a word has occurred. The letter counter 120 feeds a signal to the line 132 when the count reaches 72, and this causes a carriage return and line feed signals to be transmitted to the teleprinter after the 72nd letter, as explained later. As soon as a carriage return character has been generated, in the memory input control circuit 150, a reset signal is fed back by the line 134 into the counter 120 to reset the counter back to zero.

*Storage of teleprinter characters*

The speed of the Morse message may vary from time to time, and the amount of time required for the transmission of different Morse characters varies widely. A teleprinter operates most efficiently when the characters are fed to it at a constant speed. Also, the teleprinter requires special characters to return the carriage to the left hand margin, to feed the paper ahead, to shift the carriage from lower to upper case and from upper case to lower case, and to produce spaces between words. These characters do not appear in the Morse message and so must be generated and fed to the teleprinter in proper sequence.

In order to "take up the slack" between the variations in speed of the Morse message and the constant speed of the teleprinter and to allow the insertions of these special teleprinter characters, magnetic memory circuits shown schematically within the block 200 are used. In effect, the memory operates like a ten-position hopper with each new teleprinter character being dumped into the front end in row I as fast as the Morse characters are received and being removed in sequence from the tenth row at the other end of the hopper at proper intervals as required for transmission of the standard teleprinter code. The special characters are inserted into the appropriate first three rows of the memory in proper sequence and are removed from the tenth row in proper sequence.

*Memory input control circuits*

In order to remove or "read out" the converted signals from the conversion matrix 140 (FIGURE 1D) and to feed them in proper sequence into the magnetic memory circuits 200 (FIGURE 1F), the memory input control circuits indicated within the broken line 150 (FIGURES 1E and 1F) are used. In addition, the memory input circuits 150 generate special teleprinter characters which are fed into the memory in appropriate places so as to produce spaces between words, carriage returns, line feeds, and carriage shifts in proper sequence at the teleprinter.

In operation, letter decision pulses L′ are fed over the lead 73 and to a lead 135 which goes into a matrix read-out control 162 (FIGURE 1E) which is arranged to give a pair of brief control pulses in sequence, each of about 500 microseconds duration. Both of these pulses are fed by a lead 163 to a matrix return pulse generator 164 which then supplies a large negative pulse to a common return connection 165 (FIGURES 1C and 1D) to the conversion matrix 140. This negative pulse lasts for about 1,000 microseconds and places the matrix in condition to deliver its output. It would be possible to leave the common return 165 continuously tied to a negative voltage source so as to have the matrix output available at all times. But the matrix output is needed only at the end of each Morse character, and use of these brief return pulses greatly increases the operating life of the neon lamps used in the matrix.

The second of these 500 microsecond pulses is fed to a matrix read-out pulse generator 166 which delivers a read-out pulse by a lead 167 to each of six read-out amplifiers 171–176. These amplifiers compare the voltages on the leads 141 through 146 with the voltage provided in a line 168 by a reference voltage source 170 and deliver code pulses to the memory circuits 200 when the voltages on certain of these leads exceed the reference voltage from the source 170. This is explained more fully below.

In standard teleprinter circuits the transmission lines are continuously energized when no message is being sent and the lines are in the "stand by" condition. At the beginning of each teleprinter character, the energization of the lines is momentarily stopped, i.e. a space (a "0") is sent to the teleprinter. This first space is called the "start" signal and places the teleprinter in readiness to receive the teleprinter character which follows. Among the many advantages of the circuits shown in FIGURE 1 is that they enable an internal synchronizing pulse used in these circuits also to be used as the "start" pulse before each teleprinter character.

Because it is more convenient to have the synchronizing pulse as a "1" and because the teleprinter "start" pulse is actually a "0," all of the "1's" (marks) and "0's" (spaces) which are to be transmitted are carried in the memory circuits 200 in the inverted form. That is, all "0's" are stored as "1's" and all "1's" as "0's."

In standard teleprinter circuits a warning bell is sounded and a bell symbol is printed by transmitting an upper case "S," which is a character having a pulse in the first and third positions and having no pulse in the second, fourth and fifth positions. In binary notation, a teleprinter warning character is 10100. This alerts the operator at the receiver for unusual or important messages.

It is an advantage of these circuits that they generate this warning character whenever the incoming Morse code is garbled or includes an erroneous character or when it includes any character not having a corresponding standard teleprinter character. In these situations, the outputs from the matrix appearing on the leads 141–145 normally would all be at a high voltage, indicating "0's." In order to print a warning in these unusual situations, the first and third matrix outputs, 141 and 143 are inverted with respect to the others. Hence, they each give a low (a "1") output voltage when they normally would be empty and give a high output voltage to indicate a space.

The first and third read-out amplifiers, 171 and 173, also have their outputs inverted with respect to the remaining read-out amplifiers 172, 174, 175, 176, and 177. Thus, advantageously, the first and third read-out amplifiers enable standard teleprinter characters to be transmitted as required by the incoming message and yet enable a warning character to be generated and transmitted when erroneous or unrecognizable Morse characters are received.

As explained above, the memory 200 stores "0's" as "1's" and vice versa. Moreover, the matrix 140 operates such that a high output voltage indicates a space (a "0") and a low output voltage indicates a mark (a "1"). Thus, when the three read-out amplifiers 172, 174, and 175 are triggered by the read-out pulse on the lead 168, they deliver a code pulse (i.e. a "1") over the respective leads 182, 184, and 185 to the first row of the magnetic memory 200 whenever the respective leads 142, 144 and 145 are at a higher voltage than the reference source 170. These three leads deliver no pulse to the memory (i.e. a "0") whenever the respective leads 142, 144, and 145 are at a lower voltage than the reference source. The first and third read-out amplifiers operate just the opposite from this.

These "0's" and "1's" are temporarily stored in the respective memory units 201, 202, 203, 204, and 205 in the first row of the memory 200, which includes ten rows, and then pass quickly from row to row until they reach the last empty row.

Figure 1E:
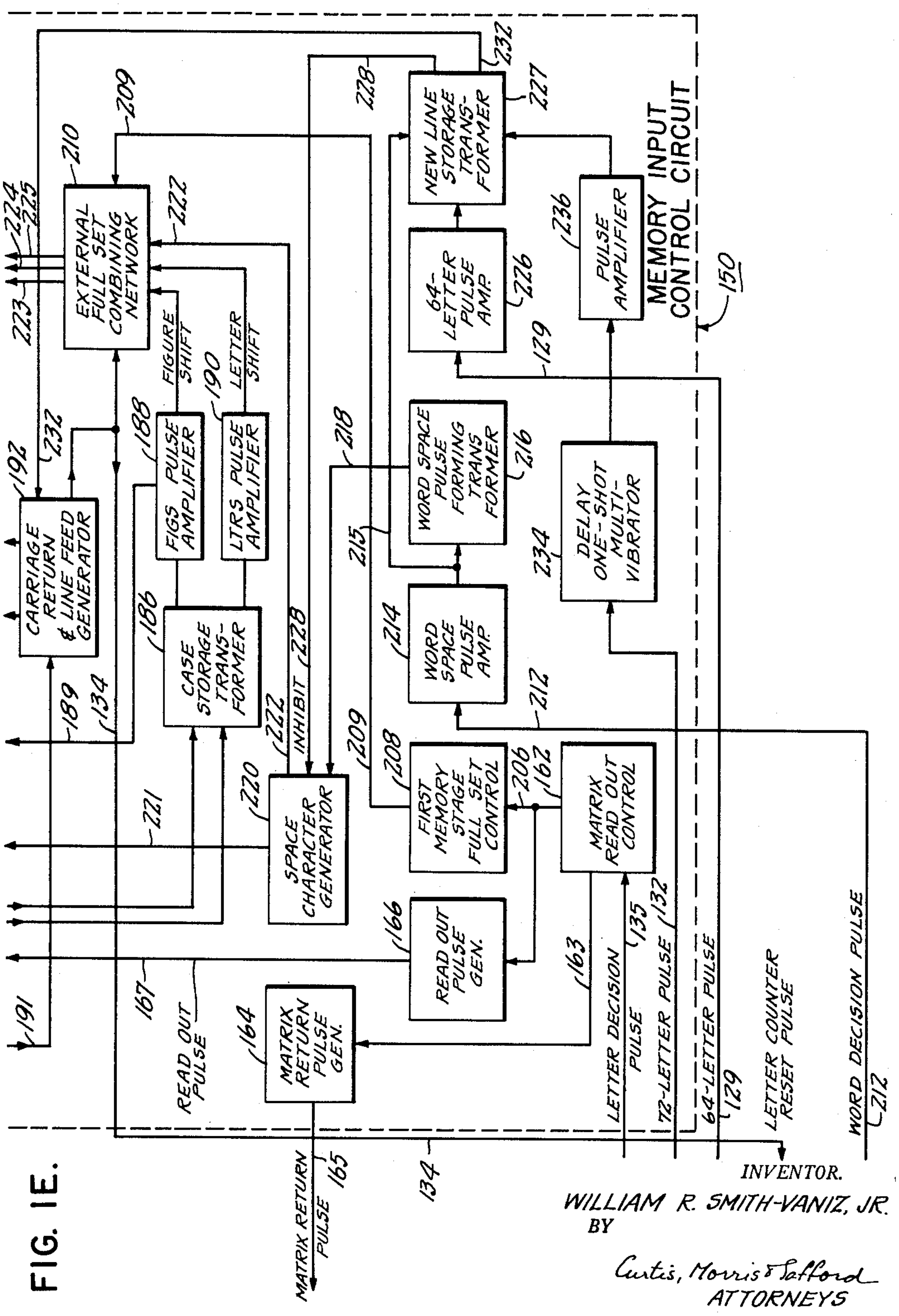
Figure 1F:
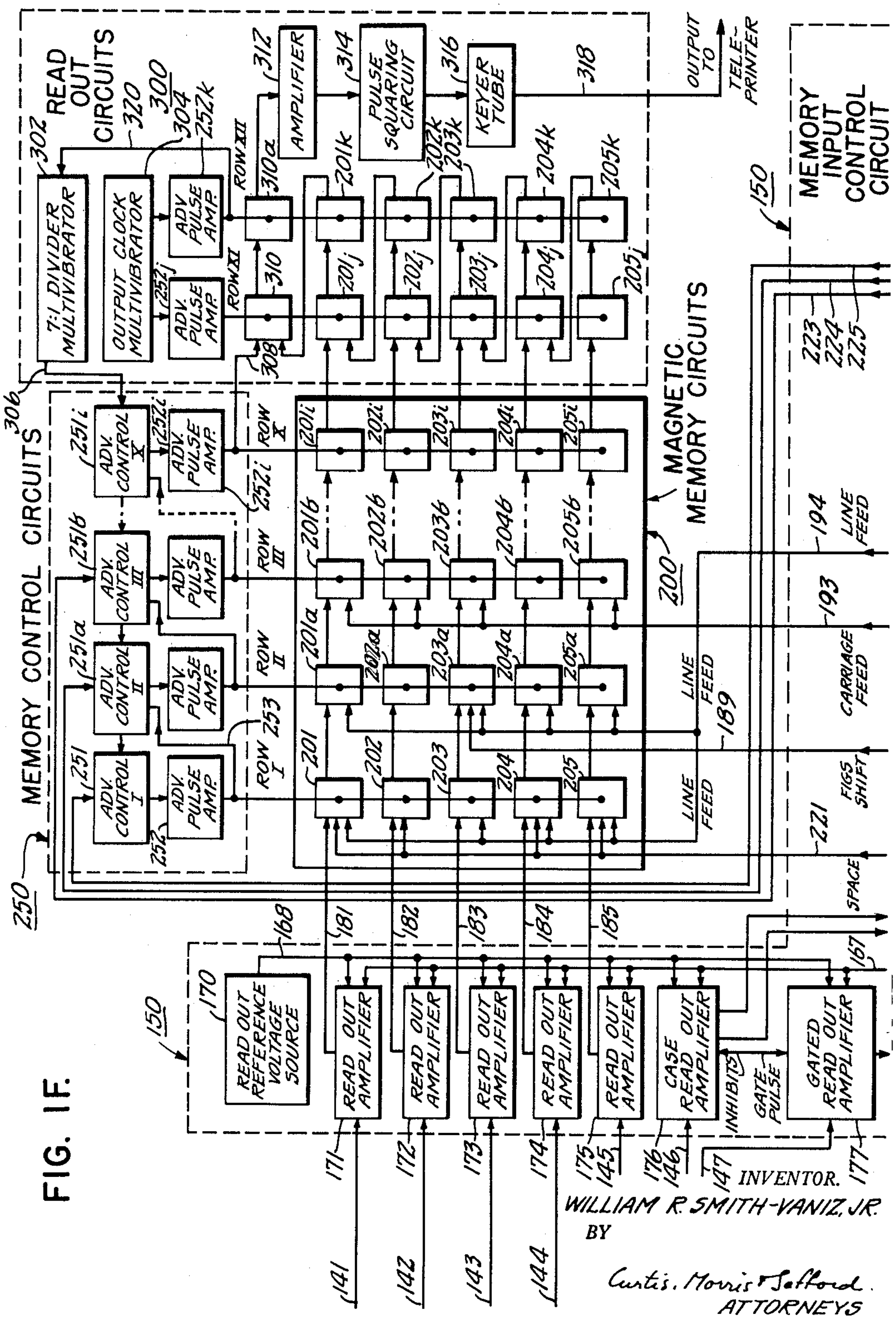

In order to shift the teleprinter from its lower case condition, in which letters are printed, into its upper case condition, in which numbers and various fractions and other symbols are printed, the case read-out amplifier 176 controls a case storage transformer 186 (FIGURE 1E). When an upper case teleprinter character is required, the voltage on the sixth lead 146 from the matrix drops below the reference voltage from the source 170, and the amplifier 176 causes the transformer 186 to energize a figures pulse amplifier 188. This feeds a figures-shift character over a lead 189 into the appropriate memory unit 203*a* of row II of the memory circuits ahead of the incoming character which requires a case shift. When a lower case teleprinter character is required, the voltage on the lead 146 remains higher than that from the source 170 and the case storage transformer is actuated so as to trigger a letters pulse amplifier 190 which causes the teleprinter to shift back to lower case. The case storage transformer 186 has high hysteresis and remains magnetized in either direction, thus delivering no case shift pulses, until forced to change by a change in the output from the case read-out amplifier 176. In effect, this case storage transformer 186 acts to remember whether the teleprinter is printing lower or upper case symbols.

When one of the special Morse characters, such as $\overline{AR}$, $\overline{BT}$, or $\overline{SK}$ is received, indicating, respectively, end of message, heading, and end of transmisison, the voltage on the seventh lead 147 from the matrix drops below the voltage from the source 170. This actuates a gated read-out amplifier 177 which acts over a lead 191 so as to trigger a carriage return and line feed generator 192 which generates pulses that are fed by the leads 193 and 194 to the appropriate memory units in the first, second and third row of the memory.

At the same time as the second 500 microsecond pulse is fed from the matrix read-out control 162 to the read-out pulse generator 166, this same pulse is fed over a lead 206 to a first memory stage full set control 208. This control 208 generates a pulse and sends it over a lead 209 to an external full set combining network 210, which initiates a series of cyclic changes in the memory circuits, described in detail later, causing the teleprinter character stored in the first row of the memory to advance quickly row by row through the memory circuits until this character reaches the last empty row, i.e. one which is immediately preceded by a "full" row. Thereafter this newly stored teleprinter character advances only one row at a time and only as fast as the preceding teleprinter characters are removed one by one from the tenth row of the memory.

To cause the teleprinter to leave spaces between words, each word decision pulse W′ is sent from space recognition circuit 50 over the lead 77 and then by a lead 212 to a word space pulse amplifier 214. This amplifier sends a pulse over a line 215, for reasons explained below, and also causes a word space pulse forming transformer 216 to feed a pulse over a lead 218 to a space character generator 220. The generator 220 then acts over the lead 221 to store a teleprinter space character in the appropriate memory units 201, 202, 204, and 205 of the first row of the memory 200. In addition, the space character generator 220 feeds a control pulse over a lead 222 to the external full set combining network 210. This combining network feeds control voltages over three leads 223, 224, and 225 to memory control circuits illustrated schematically within the broken block 250 to control the cyclic changes within the magnetic memory circuits 200 so as to advance the characters through it from row to row, as explained later.

When the sixty-fourth character has been received, the counter 120 feeds a pulse over the lead 129 to a 64-letter pulse amplifier 226 which reverses the magnetic condition of a new line storage transformer 227. Assuming that the end of a word now occurs before a count of seventy-two letters is reached, the pulse of voltage fed by the lead 215 from the word space pulse amplifier 214 changes the magnetic condition of the new line storage transformer 227 back to its initial state which it had before the 64-letter pulse arrived. This change in magnetic state generates two output pulses from the transformer 226. One of these outputs is applied by a lead 228 to the space character generator to inhibit it and prevent any space character from being fed into the first row of the memory because the next letter will be at the left-hand margin, requiring no space character to separate it from the end of the preceding word.

The other output from the new line storage transformer 227 on a lead 232 actuates the carriage return and line feed generator 192 so as to place a carriage return character into row III of the memory and to place line feed characters into the first and second rows. This produces double-spaced lines in the teleprinter. At the same time, the carriage return and line feed generator 192 sends a letter counter reset pulse back on the lead 134 to reset the counter to zero. This reset pulse also is applied to the combining network 210 to generate voltages on the leads 223, 224, and 225 as required to produce the desired cyclic changes in the memory.

In cases where the word being printed is longer than eight letters, the counter 120 continues from a count of 64 up to a count of 72, and, of course, no word decision pulse W′ is received on the lead 212. At a count of 72 the fourth counter stage 124 in the letter counter sends a pulse over the line 132 to a delay one-short multivibrator 234. This multivibrator delays until the seventy-second letter has been placed in the first row of the memory and until the first three rows of the memory circuit have become open so as to be able to receive the carriage return character and the two line-feed characters. Then the multivibrator 234 feeds a pulse through a pulse amplifier 236 into the same side of the new line storage transformer 226 as that used by the pulses from the word space pulse amplifier. The result is to energize the lead 232 so as to cause the generator 192 to form a carriage return and two line-feed characters. The rest of the long word being printed thus appears at the left-hand margin on the succeeding line.

*The memory control circuits*

During the storage of a character in any of the first three rows of the memory 200 and its advance from row to row, the memory passes through cyclic changes as directed by the memory control circuits illustrated within the broken line 250. These control circuits include ten advance controls 251, 251*a*, 251*b*, etc. and ten advance pulse amplifiers 252, 252*a*, 252*b*, etc. each associated, respectively, with one of the ten rows of the memory. Each advance control serves the functions of remembering whether or not its associated memory row has a character stored in it (i.e. is "full") or is available for storage of a character (i.e. is "empty"), and prevents a character from being fed into a row which already is full. It is the function of the external full set combining network 210 to set the respective advance controls of row I, row II, or row III of the memory into the "full" condition whenever a character is fed into the associated row of the memory. At appropriate times, each advance pulse amplifier feeds a pulse to all of the memory units in its row, causing the character stored therein to be advanced into the next respective row and also feeds a pulse to the advance control of the next row so as to place it in the full condition. As shown, each advance control is subject to the "full" condition of the succeeding advance control and is prevented thereby from actuating its own advance pulse amplifier.

For example, assume that a character is fed from the conversion matrix into the first row of the memory. At the same time as this storage occurs, the matrix read-out control circuit 162 actuates the first memory stage full set control 208 which causes the external full set combining network 210 to feed a pulse over the lead 223 to place the first advance control 251 in its "full" condition. If the second row of the memory is "empty," then a short time after the character was stored in the first row, the advance control 251 causes the advance pulse amplifier 252 to shift this character into the second row. At the same time the advance pulse is applied over a lead 253 to the second advance control to place it in the "full" condition. If the third row is "empty," then the cycle is repeated and the character is advanced into the third row and the third advance control is placed in the "full" condition, and so on.

Whenever space characters are placed in the first row by the space character generator 220, it causes the external full set combining network 210 to energize the lead 223 so as to set the first advance control into its "full" condition. Similarly, when a figures shift character is fed into the second row, or when the carriage shift and line feed characters are fed into the first, second, and third rows, the network 210 energizes the appropriate leads 223, 224, and 225 so as to set the proper ones of the first three advance controls 251, **251*a*, and 251*b*** into the "full" condition.

*Teleprinter code output*

The teleprinter code is removed from the tenth row of the memory by means of the read-out circuits 300. The rate at which the characters are removed from the tenth row is controlled by a 7:1 divider multivibrator 302 which delivers pulses at the maximum rate at which the teleprinter is capable of receiving characters. At sixty words per minute the frequency of the divider multivibrator 302 is about 6.5 cycles per second. This divider multivibrator is controlled by an output clock multivibrator 304 having a frequency seven times faster, of about 45 cycles per second.

To remove a character from the tenth row, a synchronizing pulse is fed from the divider multivibrator 302 by a lead 306 to the tenth advance control **251*i*. This returns the tenth control 251*i* to the "empty" condition and causes the tenth advance pulse amplifier 252*i* to feed an advance pulse into row ten. A brief instant after the advance control 251*i* goes into the "empty" condition it causes the preceding advance control 251*h* to revert to the "empty" condition, which in turn causes the advance pulse amplifier 252*h* to generate an advance pulse, shifting the character from row nine into row ten. This advance pulse returns the tenth advance control 251*i*** to the "full" condition. Similarly, a brief instant after the ninth advance control is switched into the "empty" condition, the cycle repeats causing the character in the eighth row to advance to the ninth, and so on. It requires only about 300 microseconds to advance each succeeding character to the next successive row.

When an advance pulse is fed from the tenth amplifier **252*i* into the tenth row to advance a character to the eleventh row, this same advance pulse is delivered over a lead 308 to a sixth memory unit 310 in the eleventh row to place it in the "1" condition. In effect, this "1" is generated as a result of the synchronizing pulse fed from the divider multiplier over the lead 306**. This "1" is later inverted and serves as the "start" pulse.

The eleventh and twelfth rows each include a sixth (uppermost) memory unit 310 and **310*a*, respectively, which are under the common control of the output clock multivibrator 304. These two rows are so interconnected that an advance pulse fed from the eleventh advance pulse amplifier 252*j* to the eleventh row moves the data from each of the six memory units in the eleventh row into the corresponding memory units in the twelfth row. But an advance pulse fed into the twelfth row feeds out the first "1," the inverted "start" pulse of the teleprinter code group from the unit 310*a* into an amplifier 312 and causes the remaining data to return into the eleventh row but being shifted one unit higher. Thus, following the transfer of a character from row ten to row eleven, the first pair of advance pulses (one to row eleven, and a later one to row twelve), moves the "1" which was in the unit 310 into the amplifier 312. This "1" is amplified and fed through a pulse squaring circuit 314 which inverts it and then feeds it into a keyer tube 316 which sends the "start" space over the line 318 to a teleprinter. The next pair of advance pulses feed the first element of the teleprinter code group from the unit 310 into the amplifier 312** and again return the data to the eleventh row, where it is now shifted two units higher than originally and so forth.

Pairs of advance pulses are fed to the eleventh and twelfth rows in a steady sequence under the control of the clock multivibrator, the pairs of advance pulses occur at the 45 cycle per second frequency of the clock so that they repeat every 32 milliseconds. The first pulse of each pair occurs about 1 millisecond before the second pulse, and the first pulse is fed to row twelve.

In summary of this operation, it is seen that the first pair of these advance pulses in the eleventh and twelfth rows sends out the start space. The next five pairs of advance pulses sends out the five elements of the teleprinter character. The seventh pair of advance pulses finds all six of the memory units in both rows empty and so there is a "0" output. Because of the inversion in the pulse squaring circuit this "0" becomes a steady "mark" voltage which forms the "stop" pulse and is the standby condition of the line between characters.

The 7:1 divider multiplier 302 is triggered by the last advance pulse of the seventh pair which is fed by a lead 320 into the multiplier 302. Thus, the teleprinter characters are removed from the memory and fed into the line at a constant rate which is under the control of the clock 304 and can be set to any optimum rate desired. The above periods of time and frequencies are extremely well suited for sending sixty words per minute (WPM) over a standard teleprinter line.

When the Morse code message is slower than 60 WPM the output circuit 300 periodically finds that the tenth row of the memory has not been filled. Then the output to the amplifier 312 is all "0's." No "start" pulse is generated, because the tenth advance control **251*i* is already "empty," and hence the 7:1 divider multivibrator can not actuate this advance control, so that no advance pulse is fed into the unit 310** and it remains in the "0" condition. All of these "0's" are inverted and produce a steady mark voltage, so that the teleprinter remains in standby condition, until the next character has filled the tenth row of the memory.

DETAILED DESCRIPTION OF THE METHODS AND APPARATUS OF THE PRESENT INVENTION

Figure 2A:
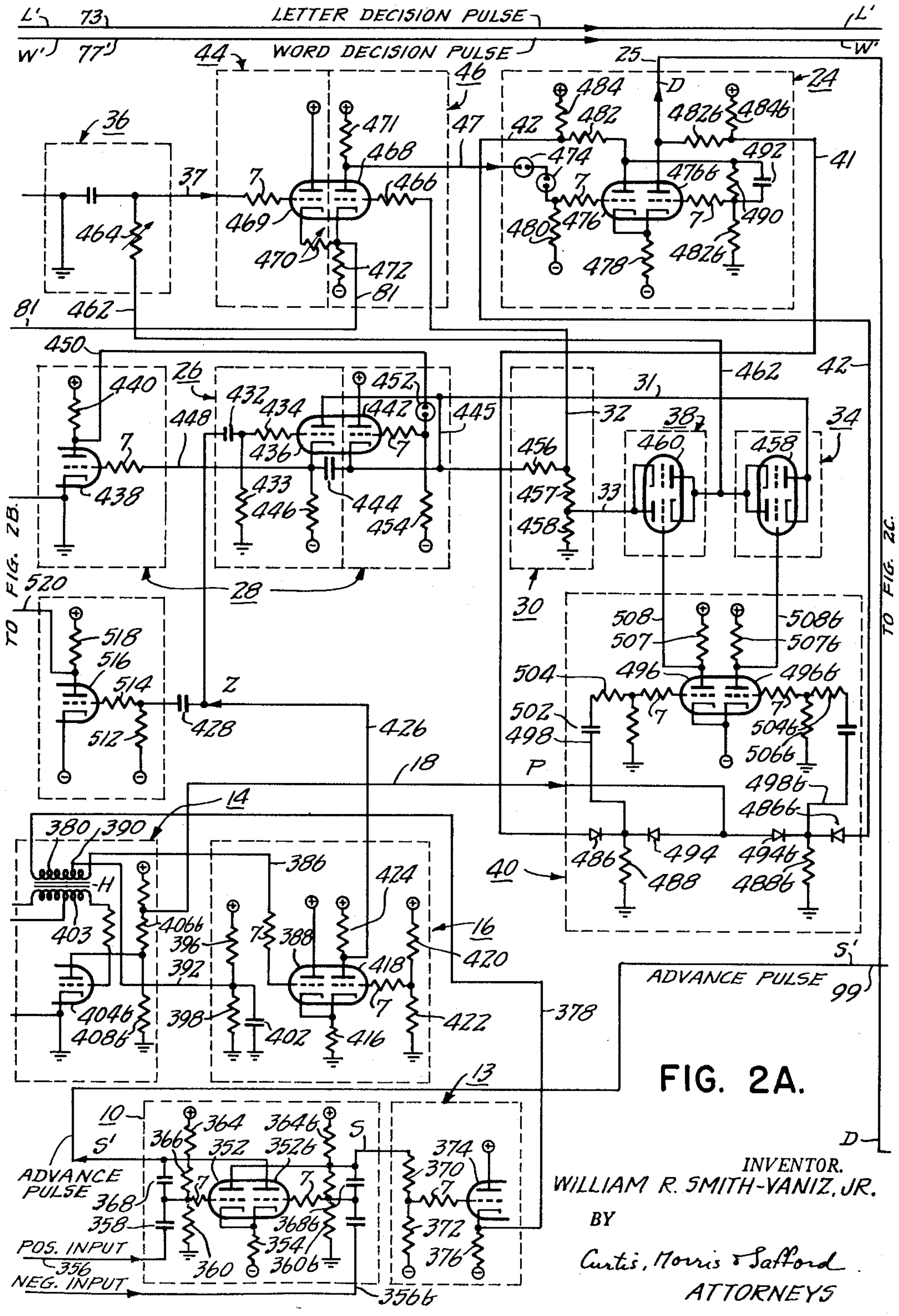
FIGURES 2A, 2B, 2C, 2D, 2E, 2F, 2G, 2H and 2J are detailed schematic circuit diagrams of apparatus highly suited for performing the methods illustrated in FIGURE 1. To facilitate following the description, it is suggested that FIGURE 2 be separated from the specifications and be arranged as shown in FIGURE 4, with 2D above and straddling both 2C and 2E.
Figure 2B:
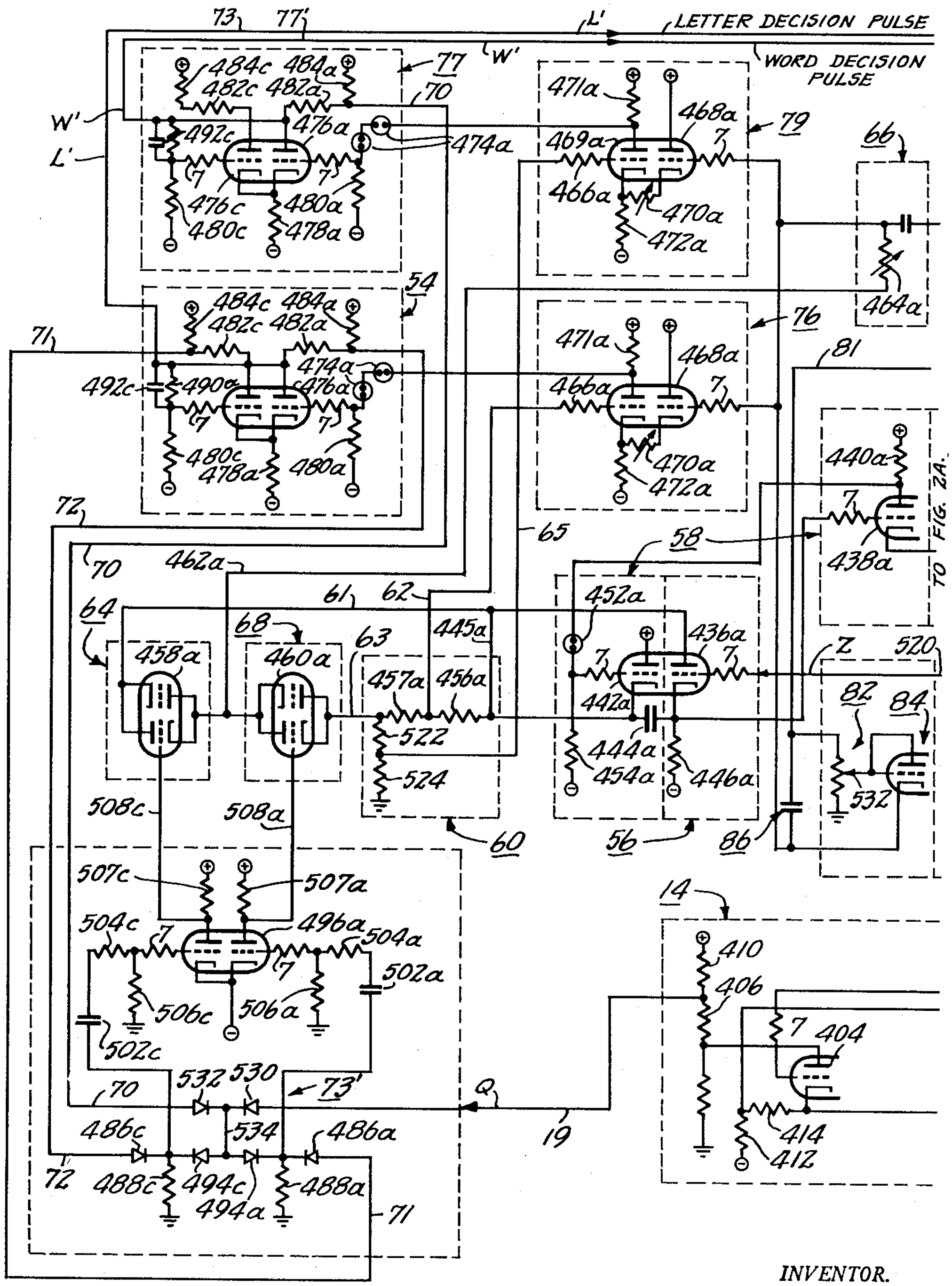
Figure 2C:
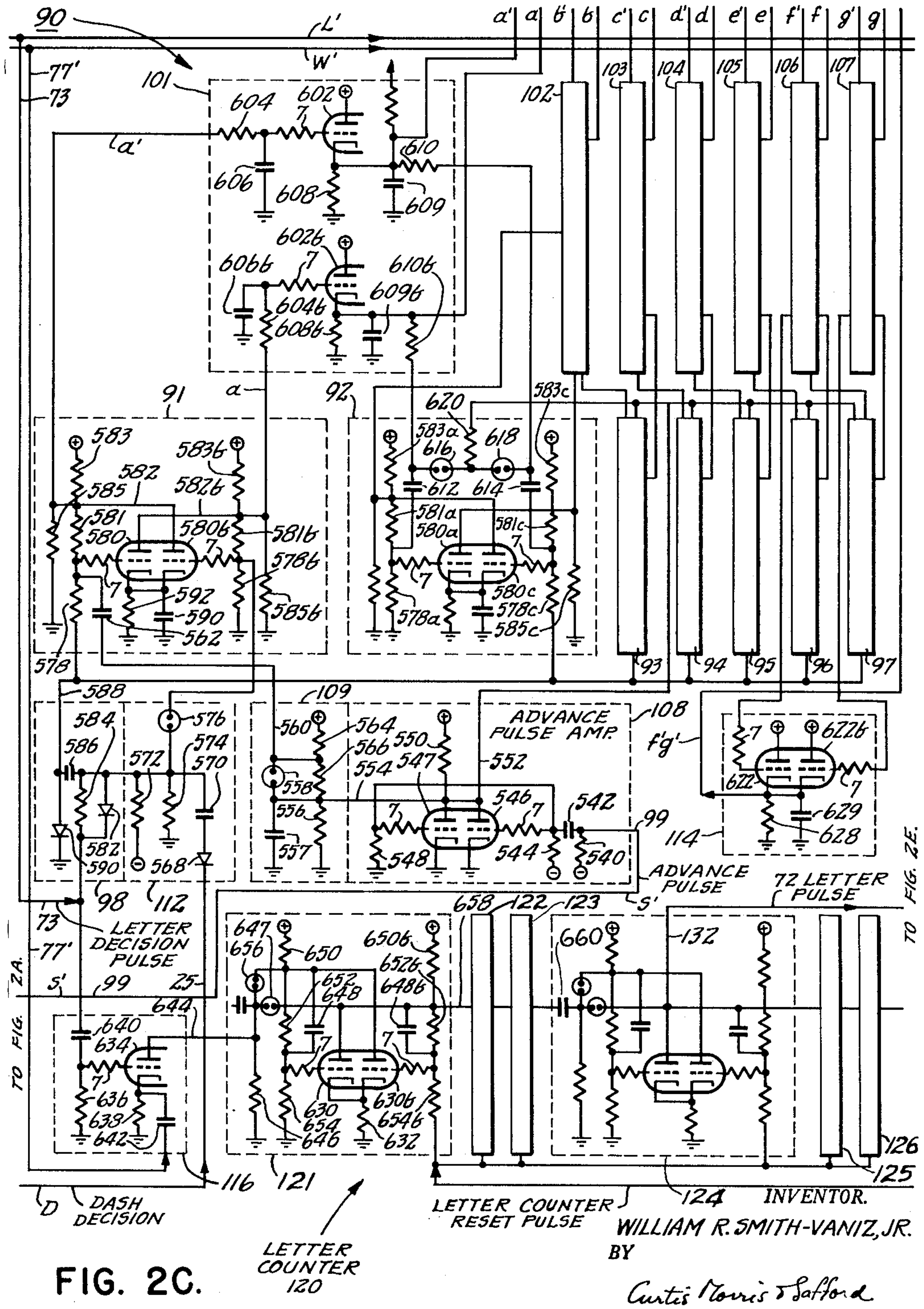
Figure 2D:
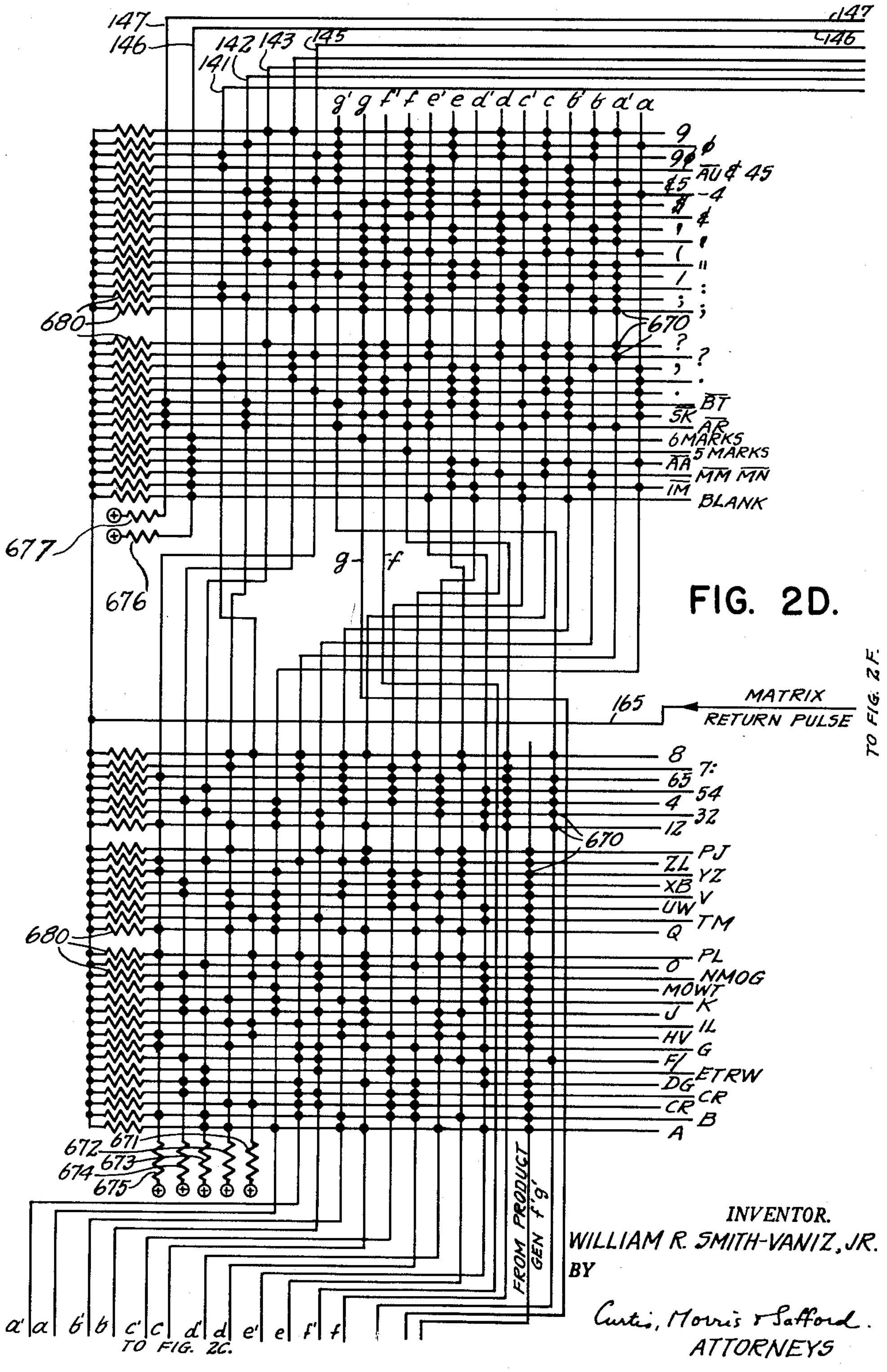

As shown in FIGURE 2A the pulse squaring input circuit 10 includes a pair of triodes 352 and **352*b* having their cathodes tied together and connected through a common cathode resistor 354** to a source of negative voltage indicated by a minus sign within a circle. This negative voltage source is provided by a power supply having a conventional transformer, full-wave rectifier and filter circuits (not shown), as will be understood by those skilled in the art, including suitable conventional voltage regulation means so as to hold this negative voltage at a suitable substantially constant value, such as —150 volts. In this description it is called B—.

If the keyed D.-C. Morse code input is positive it is connected to an input lead 356 and coupled through a coupling condenser 358. The signal is applied across a grid return resistor 360 and fed through a small resistor 7 to the grid of triode 352. The purpose of the resistor 7 is to prevent high frequency oscillations due to any stray capacitances associated with the triode 352. I find that a value of 330 ohms is suitable for this purpose and include such resistors at numerous places through the circuits shown. To simplify the description, all of these grid resistors having this function are indicated by the reference numeral 7.

In the pulse squaring circuit 10 the elements on the right side perform functions corresponding to those of elements on the left side, except for the fact that in operation the voltages in the two halves of the circuit change in opposite directions. Thus, corresponding reference numerals are used followed by a suffix "*b*." This system of notation will be used throughout the description where circuits include two similar halves performing corresponding functions but in which the voltages move in reverse directions, that is, as the voltages in one half "flip" in one direction while those in the other "flip" in the opposite direction.

In this description both dots and dashes are called marks, in distinction to the spaces between them. In operation, whenever a mark is received on the lead 356, the triode 352 is thrown into full conduction, cutting off the flow of current through the tube 352*b*. This causes the voltage at the anode of the tube 352*b* to rise sharply, generating a positive pulse S' (an advance pulse) on the lead 99. This anode is energized through an anode load resistor 364 from a source of positive voltage indicated by a plus sign within a circle. This positive voltage source is also provided by a conventional power supply, including suitable conventional voltage regulating means and filter means (not shown), as will be understood by those skilled in the art, so as to provide a suitable, substantially constant positive voltage, such as +250 volts. In this description this positive source is called B+. In addition, in order to increase the isolation between all of the various components of this apparatus, a by-pass capacitor of suitable value, such as .01 microfarad, is connected between the positive voltage connections ⊕ within each dotted line and the common return, i.e. "ground" connection of the apparatus, indicated by the convention ground symbol.

To simplify these drawings as much as possible while giving a complete and detailed understanding of the methods and apparatus described, the power supplies which provide the positive and negative voltages are not shown and these bypass capacitors are omitted. It will be understood that the cathodes of the various vacuum tubes are heated by conventional low voltage alternating current circuits connected to the usual type of step-down transformers, not shown.

As the right anode becomes more positive, a portion of this voltage is fed back to the grid of triode 352 through a resistor 366, shunted by a capacitor 368. This gives the output pulses S and S' square corners as desired. When the input code is in the form of keyed negative D.-C. it is connected to the other input lead 356*b*, as will be understood. In the signal S fed from the input circuit 10 to the cathode follower stage 13, mark pulses are negative.

The cathode follower isolating stage 13 into which the output S from the circuit 10 is connected includes a voltage divider comprising a pair of resistors 370 and 372 with their junction connected to the grid of a triode 374 having its anode connected to B+ (with a by-pass capacitor to ground not shown, and not mentioned in corresponding places hereinafter) and its cathode connected through a cathode resistor 376 to B—.

The output from the cathode circuit is fed over a lead 378 to the primary 380 of a delay pulse transformer H in the delay circuit 14. The other side of the primary 380 is connected through a lead 386 to the grid of a triode 388 in the cathode coupled amplifier 16. In order to provide a delay of about 1 millisecond, a tap 390 on the primary 380 is connected through a lead 392 to an intermediate point between resistors 396 and 398 on a voltage divider connected between B+ and ground, with a relatively large condenser 402 (.05 mf., i.e. microfarad) across the resistor 398. The voltage on the lead 392 tends to be held by this voltage divider at a value mid-way between that which occurs at the cathode of the cathode-follower triode 374 in the mark condition and in the space condition. Thus, in the absence of any mark pulse, the core of this transformer H is saturated in one direction. This transformer requires 1 millisecond to saturate in the opposite direction. During the time it is reversing saturation, its primary 380 presents a high impedance and prevents the beginning of a mark pulse from reaching the triode 388.

During this delay at the beginning of a mark the grid of a triode 404 (FIGURE 2B) in the delay circuit is driven positive by the secondary 403. Its anode then delivers a negative pulse Q through a resistor 406 to the lead 19. This triode 404 has its cathode grounded, and its anode is connected to ground through a resistor 408 and is connected to B+ through the resistor 406 in series with a resistor 410.

A center tap on the secondary 403 is connected to the junction of a pair of resistors 412 and 414 connected from B— to ground (FIGURE 2A).

At the end of this 1 millisecond delay, the beginning of the negative mark pulse reaches the triode 388, turning it off, and dropping the voltage across the common cathode resistor 416. This turns on the other triode 418 of the amplifier 16 which has its grid connected to a voltage divider including a pair of resistors 420 and 422 connected between B+ and ground. Thus, a negative pulse appears across an anode load resistor 424 connected from the anode of the triode 418 to B+. This negative pulse (in the delayed signal Z) is fed through a lead 426 to a coupling condenser 428 and also is fed by a lead 430 to a coupling capacitor 432 connected across a grid return resistor 433 and through a grid leak resistor 434 to the grid of a triode 436 in a gate circuit 26 which has the function of controlling the mark integrator circuits 28.

The mark integrator circuits 28 include a triode 438 connected as a Miller integrator and having its cathode connected to ground and its anode connected through an anode load resistor 440 to B+ and also comprises a triode 442 which is arranged as a cathode follower in the other part of the circuit 28, as shown, effectively to couple an integrator or saw-tooth condenser 444 between the anode and grid of the triode 438.

When it conducts, the gate triode 36 effectively short-circuits the capacitor 444 through a lead 445 between its anode and this capacitor. As the beginning of the negative mark pulse reaches the triode 436, conduction through this triode is cut off, allowing the condenser 444 to begin charging. The charging path is from B+ through triode 442, then through the capacitor and through a resistor 446 to B—. The voltage across this resistor 446 is coupled through a lead 448 to the grid of the integrator triode 438 whose anode is connected through a lead 450 and a neon bulb 452 to the grid of the cathode follower 442 to control the rate of charging. The result is a linear rise in the voltage across the condenser 444 which begins at the instant when the delayed mark pulse begins at the resistor 434.

This saw-tooth voltage is applied from the condenser 444 to the top of a voltage-divider circuit 30 comprising three series resistors 456, 457, and 458 connected to ground. The top of this divider is connected through the lead 445 and the lead 31 to apply the full saw-tooth voltage to the anodes of a dual triode 458 in a bi-directional switch 34.

The lead 33 applies ⅓ of the saw-tooth voltage to the anodes of a dual triode 460 in the bi-directional switch 38. The cathodes of these tubes 458 and 460 are connected together and connected by a lead 462 to a variable resistor 464 connected to the dot-dash recognition storage capacitor 36 which has its other terminal grounded.

The lead 32 applies $1/\sqrt{3}(.577)$ of the saw tooth voltage through a grid isolation resistor 466 to the grid of a triode 468 in the dash recognition comparison amplifier 46. This triode has its anode connected through a resistor 470 to B+ and has its cathode connected through a resistor 472 to B−. The voltage on the mark reference storage capacitor 36 is fed through a lead 37 to the grid of a triode 469 in the cathode-follower stage 44. Its cathode is connected through an adjustable resistor 470 to the cathode of the triode in the comparison amplifier 46.

When the incoming mark lasts long enough that the voltage on the lead 32 rises above that on the lead 37, a dash decision is made. Conduction through the cathode follower 469 is cut off, while the triode 468 is thrown into full conduction. This produces a voltage drop in the lead 47 which is coupled through a pair of voltage-isolation neon bulbs 474 to the grid of a triode 476 in the output trigger circuit 24. The triode 476 has its cathode connected to B− through a resistor 478 and has a grid return resistor 480 also connected to B−. Its anode is connected to B+ through a resistor 482 in series with a resistor 484, with their junction connected over a lead 42 to a rectifier **486*b* in the switch control circuit 40 having its other terminal connected to ground through a resistor 488*b*. The other half of the output trigger circuit 24 is similar except that the anode of the triode 476 is coupled to the grid of the triode 476*b* through a resistor 490 in parallel with a capacitor 492 and the grid return resistor 480*b* is connected to ground. The dash decision pulse D is a negative pulse on the lead 25 from the anode of the triode 476*b***.

The junction of the resistors **482*b* and 484*b* is connected over the lead 41 to a rectifier 486 in the control circuit 40 having its other terminal connected to ground through a resistor 488. Between the top ends of the resistors 488 and 488*b* are a pair of rectifiers 494 and 494*b* connected back-to-back with their common connection connected to the lead 18**.

These four rectifiers and resistors in the circuit 40 in effect form gate circuits to control a pair of triode amplifiers 496 and **496*b* which in turn control the bi-directional switches 38 and 34**, respectively.

When a mark decision is made, the lead 41 drops to a lower voltage while the voltage on the lead 42 rises. This condition of the leads 41 and 42 continues until the end of the mark reaches the delay circuit 14. Then a negative pulse P is formed on the lead 18, caused by the pulse of conduction through the triode **404*b* during the 1 millisecond when the pulse transformer 382** is reversing its magnetization.

The result of this negative pulse P is to drop the voltage across the resistor 488. This feeds a negative pulse along the lead 498 through a coupling condenser 502 and a resistor 504 and across a grounded grid return resistor 506 to the grid of the triode 496. The negative pulse P has no effect on the voltage of the lead **498*b* because the high voltage on the lead 42 feeds through the rectifier 486*b* and holds up the voltage across the resistor 488*b***.

In the absence of a dash decision, the relative values of the voltages on the leads 41 and 42 are reversed. Then the negative pulse P causes the voltage on the lead **498*b* to drop and does not affect the lead 498**.

Thus, when a dash decision has been made, the voltage on a lead 508 from the anode load resistor 507 is raised, raising the grid voltage of the dual triode 460, which is thrown into conduction. That is, the bi-directional switch 38 is closed so as to complete a circuit from the lead 33 through a lead 462 and the adjustable resistor 464 to the storage capacitor 36. Thus, the reference voltage thereon is modified in accordance with one-third of the peak value of the saw-tooth voltage generated by the mark integrator circuit 28. If the voltage on the condenser 36 is above the voltage on the lead 33, the condenser is partially discharged down to this voltage through the upper half of the dual triode 460. If the voltage on the lead 33 is above the voltage on the condenser 36, then the condenser is charged to the higher voltage by conduction through the lower half of the dual triode 460.

In this way, when a dash is received the voltage on the storage capacitor 36 is automatically adjusted to a value as a function of one-third of the duration of this latest dash. When a dot is received the switch 34 is closed, and the voltage on the condenser 36 is automatically adjusted to a value as a function of the full duration of this latest dot. Accordingly, the voltage on condenser 36 provides an accurate and sensitive criterion for distinguishing subsequent dashes from dots.

In order to prevent the voltage on the condenser 36 from fluctuating too rapidly while at the same time allowing it to vary fast enough to follow rapid changes in message speed, I find it advantageous to have a condenser 36 of 0.22 microfarad and an adjustable resistor 464 of 100,000 ohms, providing a maximum time-constant of approximately 0.02 second.

As mentioned above, the voltage on the lead 32 is $1\sqrt{3}$ times the voltage on the condenser 444. I use this geometric mean value between 1 and ⅓ because I have chosen the saw-tooth voltage as a function which rises linearly with time, and this geometric mean value gives the best criterion for distinguishing dots from dashes. Assuming that the incoming mark was so short that the voltage on the lead 32 from the voltage-divider circuit 30 did not exceed the voltage stored on the condenser 36, then no dash decision is made. That is, the dash recognition comparison amplifier 46 has "recognized" the incoming mark as being a dot. The voltage on the lead 47 remains high, so the voltage on the lead 42 remains low. This acts together with the negative end-of-mark pulse P on the lead 18 to lower the voltage on the lead **498*b*. Accordingly, the triode 496*b* in the control circuit 40 is cut off. This raises the voltage on the lead 508*b*, placing the dual triode 458 in full conduction, thus closing the switch 34 and connecting the lead 31 to the lead 462 so as to apply the full peak value of the sawtooth voltage on the condenser 444 to the reference storage condenser 36. Thus, the voltage on this storage condenser 36** is modified slightly in accordance with the length of the latest dot so as to provide an accurate reference for distinguishing subsequent dashes and dots from each other.

The other portion of the Morse recognition circuit 22 of FIGURE 2A which distinguishes end-of-letter spaces from end-of-word spaces and from intra letter spaces, is generally similar to the portion described above. Elements of this space-recognition portion of the circuit, which perform functions corresponding to those of elements in the dot-dash recognition portion having plain reference numerals, have corresponding reference numerals with a suffix "*a*." These elements of the space recognition circuit, which perform functions corresponding to those of elements in the mark recognition circuit having reference numerals with the suffix "*b*," have the suffix "*c*."

As explained above, after a delay of 1 millisecond, the beginning of a mark (i.e. end of a space) appears on the lead 426 from the cathode-coupled amplifier 16. This drop in voltage is coupled through the condenser 428 and across a grid return resistor 512 and through a grid lead resistor 514 to a grid of a triode 516 having its cathode connected to B−. Its anode is connected through an anode load resistor 518 to B+. At the beginning of a mark the drop in voltage on the grid of this triode produces a rise in voltage on a lead 520 connected to the grid of a triode **436*a* in the gate circuit 56. This places the triode 436*a* of the gate circuit 56 in full conduction, serving to discharge the integrator condenser 444*a* in the space saw-tooth generator circuit 58**.

Thus, in order to measure the lengths of spaces, it is seen that the space saw-tooth generator circuit 58 is turned off at the beginning of each incoming mark, whereas the mark saw-tooth generator circuit 28 is turned on at this time.

At the end of the incoming mark (i.e. beginning of the space) the voltage on the lead 520 drops, cutting off conduction through the triode 436*a* and allowing the voltage on the integrator capacitor 444*a* to rise linearly with time.

The voltage on this condenser 444*a* is applied to a voltage-divider circuit 60, which is similar to the divider circuit 30, except that it includes 4 resistors—456*a*, 457*a*, 522 and 524 so as to provide three outputs on the leads 62, 63, and 65 having fractional values of $1/\sqrt{3}$, ⅓, and $1/\sqrt{21}$ times the voltage on the condenser 44*a*, respectively.

The reason that these three values are chosen is that the letter spaces, that is, those occurring at the end of a Morse character are three times as long as the element spaces, that is, those within a Morse character. The word spaces are seven times as long as the element spaces. The fractional value of $1/\sqrt{3}$ is the inverse of the geometric mean between the relative lengths of element spaces and letter spaces, while the value $1/\sqrt{21}$ is the inverse of the geometric mean between the relative lengths of letter spaces and word spaces. Using these geometric mean fractional values of the voltage on the condenser 444*a* for comparison with the voltage on the reference storage capacitor works to good advantage as providing the most sensitive criteria for distinguishing the three kinds of spaces from each other when a linear saw-tooth voltage is used.

The letter-space recognition comparison amplifier 76 and the word-space recognition comparison amplifier 79 are identical with the dash recognition comparison amplifier 46. The input voltages from the voltage divider circuit are connected by the leads 62 and 65, respectively to the comparison amplifiers 76 and 79. Both these comparison amplifiers 76 and 79 are also connected through the leads 526 and 528, respectively, to the output of the space recognition storage capacitor circuit 66 and to the bias storage capacitor 86.

When the incoming space lasts sufficiently long that the voltage on the lead 62 exceeds the voltage stored on the capacitor 66, a letter decision is made and a reduced voltage is fed over the lead 75 to the letter-decision trigger circuit 54. This causes the voltage on the lead 72 to rise and reduces the voltage on the lead 71.

When this incoming space ceases, the negative end-of-space pulse Q on the lead 19 is fed to a rectifier 530 in the word space suppressor circuit 73'. This suppressor circuit 73' comprises the rectifiers 530 and 532, which are connected face-to-face with their junction tied by a lead 534 to the junction of the rectifiers 494*a* and 494*c* in the switch control circuit 70. The result of reduced voltage on the lead 71 acting together with the negative pulse Q is to drop the voltage on the lead 498*a*, turning off the triode 496*a* and raising the voltage on the lead 508*a*. This turns on the dual triode 460*a* in the bi-directional switch 68 and completes a circuit from the lead 62 through the lead 462*a* to apply one-third of the peak value of the integrated voltage on the condenser 444*a* to the space reference storage capacitor 66.

When the incoming space is so short that no letter decision is made, the voltage on the lead 72 is low. Then the negative end-of-space pulse Q on the lead 19 lowers the voltage on the lead 498*c*, thus closing the bi-directional switch 64 and connecting the peak value of the integrated voltage on the condenser 444*a* to the storage reference capacitor 66. Thus, the voltage on this reference capacitor is modified in accordance with the latest information about the relative lengths of the spaces between letters and the spaces within letters of the Morse message being received. This provides an accurate, up-to-date criterion for distinguishing the three kinds of spaces: (1) intra-letter spaces, (2) end-of-letter spaces, and (3) end-of-word spaces.

As mentioned above, the spaces which occur at the ends of words vary widely in their duration, depending upon the practice of the operator transmitting the message and various pauses which may occur during transmission. To prevent these end-of-word spaces from modifying the voltage stored on the condenser 444*a*, the word-space comparison amplifier 79 in conjunction with the word-decision trigger circuit 77 is arranged to actuate the suppressor circuit 73'. This closes both of the bi-directional switches 64 and 68, preventing any modification of the reference voltage on condenser 444*a* during end-of-word spaces.

Upon the recognition of a word space, an increased voltage is applied by the trigger circuit 77 through the lead 70 to the rectifier 532 in the suppressor circuit. This increased positive voltage raises the voltage on the lead 534. Thus, when the end of space pulse Q appears on the lead 19, it is rendered ineffective and cannot reduce the voltage on either of the leads 498*a* or 498*c*. Thus, both of the triodes 496*a* and 496*c* remain in conduction, and so the switches 64 and 68 remain closed.

As mentioned above, during periods when the message being received is slowing down, this circuit might begin to confuse other types of spaces with the longest spaces occurring at the ends of words. If this confusion should begin to occur, then the suppressor circuit 73' would prevent any increase in the voltage stored in the reference capacitor 66. Hence, the apparatus would, in effect, become "stuck" and begin to recognize all of the incoming spaces as word spaces.

In order to assure that the effective reference voltage increases during periods of sudden decrease in message speed, the interconnection control circuit 80 connects the voltage appearing across the cathode resistor 472 in the comparison amplifier 46 over a lead 81 to the top of a control potentiometer 82, which is connected to a bias-storage capacitor 86. A bias-limit rectifier 84 is connected from the movable contact 532 of the potentiometer 82 to the other side of the capacitor 86. Thus, the capacitor 86 stores a voltage which is a fraction of the voltage being supplied by the comparison amplifier 46 to the trigger circuit 24. The fraction of this voltage is adjusted by the potentiometer 82. It effectively prevents the voltage applied to the leads 526 and 528 from dropping below a predetermined fraction of the voltage on the mark reference storage capactior 36. Thus, an accurate criterion for distinguishing the various kinds of spaces is maintained even during periods when the message speed is rapidly decreasing.

It is usually advantageous to adjust the potentiometer 82 such that the voltage on the condenser 86 prevents the voltage on the leads 526 and 528 from dropping below that which would occur if the letter spaces were of a length lying in the range from about 50% to about 100% of the length of the dashes. A value of about 75% works to good advantage in many cases.

Also, I find it advantageous to divide the storage of the space reference voltage between the space reference storage circuit 66 and the bias storage circuit 86 so that the total effective time constant of these circuits acting together is the same as the time-constant of the mark reference storage circuit and so that three-quarters of any change in the mark reference voltage immediately appears as a change in the effective space reference voltage. Both the space reference storage circuit 66 and the bias storage circuit 86 contribute to the effective time constant of this space reference voltage circuit.

The positive pulses transmitted over the leads 73 and 77 when a letter decision and a word decision is made are generated in the trigger circuits 54 and 77, respectively, in a manner similar to the generation of the negative dash decision pulses in the trigger circuit 24. The only difference between these trigger circuits 54 and 77 and the circuit 24 is that the output connections are taken from the corresponding opposite triodes to provide positive pulses as desired, instead of negative pulses.

DETAILED DESCRIPTION OF SINGLE CHARACTER MORSE STORAGE REGISTER

As the dots and dashes of an International Morse character are received, they are stored in the single character Morse storage register 120. As each mark is received, the input trigger circuit 10 generates an advance pulse S′, which is fed over the lead 99 into an advance pulse amplifier and differentiator circuit 108. This circuit 108 actuates a reset circuit 109 to reset the first storage circuit 91 in the register 120 to a "0" condition and also causes the various "1's" and "0's" in the various storage circuits 91–96 to advance to the respective next successive storage circuits.

The positive advance pulse S′ is applied to a differentiator circuit including a resistor 540 connected to B− and a condenser 542. This circuit differentiates the leading edge of each positive advance pulse, applying a spike of positive voltage across a resistor 544 which is connected from B− to the grids of a pair of triode amplifiers 546 and 547 connected in parallel. A resistor 548 connected between ground and the grids of these tubes acts in conjunction with the resistor 544 as a voltage divider so as to apply a large negative bias to these grids. The spike of positive voltage places these triodes 546 and 547 in full conduction, generating an amplified negative spike across an anode load resistor 550 connected to B+. This negative spike is fed through a lead 552 to a shift line 110 and shifts all of the "0's" and "1's" to the respective next successive circuits.

It is desired to lengthen somewhat the duration of the negative spike of voltage on the shift lead 110, so as to make sure that all of the shifts have been made in the register 120 before this shift-voltage spike dies away. Accordingly, a small condenser 557 is connected in parallel with a resistor 556 and connected from ground through a lead 554 to the anodes of these triodes 546 and 547.

When the trailing edges of the advance pulse appears on the lead 99, it produces a negative spike of voltage in the differentiator circuit which has no effect upon the triodes 546 and 547 because of their large negative grid bias.

In order to reset the first storage circuit 91 back to "0," the negative spike of voltage at the anodes of these triodes 546 and 547 is fed through the lead 554 and through a neon bulb 558 in the reset circuit 109 and then by a lead 560 to a coupling condenser 562 in the first storage stage 91. A resistor 564 in series with a resistor 566 is connected from B+ to the lead 554, forming a voltage divider, with the junction of these resistors being connected to the lead 560 to provide the desired voltage bias across the neon bulb 558, so as to isolate the anode voltage on the triodes 546 and 547 from the grid of the triode 580 in the first storage circuit 91.

In order to place a "1" in the first storage circuit 91 whenever a dash is recognized, the negative dash decision pulses are fed over the line 25 to a rectifier 568 in the rectifier and pulse-former circuit 112. The other terminal of this rectifier 568 is coupled through a capacitor 570 to a voltage divider comprising a pair of resistors 572 and 574 connected in series from B− to ground. The negative leading edge of the dash decision pulse causes a flow of current through the rectifier 568, applying a negative pulse through the condenser 570 and through a grid-voltage isolating neon bulb 576 to a resistor 578b connected to ground. This negative pulse drives the grid of a triode 580b in the storage circuit negative and so cuts off conduction through this triode. As a result, there is a rise in the voltage on a lead 582 from the anode of this triode 580b, raising the voltage on "*a*′" lead connected from the lead 582 to the control circuit 101. The cathodes of the triodes 580 and 580b are tied together and connected to ground through a resistor 592 in parallel with a condenser 590. When the tube 580b stops conduction, the current from B+ through a resistor 583 to the lead 582 is reduced. The resulting increase in voltage on the lead 582 feeds through a resistor 581 to the grid of the other triode 580, placing it in full conduction, thus lowering the voltage on the lead 582b and lowering the voltage on the "*a*" lead connected to the control circuit 101. This places the storage circuit 91 in the "1" condition, that is, with "*a*′" more positive than "*a*." The trailing edge of the dash decision pulse on the lead 25 does not disturb the "1" which was set into the circuit 91 for it is blocked by the rectifier 568.

The positive letter pulses L′ are applied over the lead 73 to a rectifier pulse-former circuit 98. At the end of a letter decision pulse, the voltage on the lead 73 drops. This draws a pulse of current through a rectifier 582, generating a voltage across a resistor 584, which is coupled through a condenser 586 to a lead 588 connected to the reset line 100. This lowers the voltage on the reset line 100, and places the six storage circuit 91, 93, 94, 95, 96 and 97 back to "0," and places the second storage circuit 92 in the "1" condition, for the lead 100 is connected to the grid of the triode in the opposite side of the circuit 92. A rectifier 590 in the circuit 98 connected from the lead 588 to ground serves to short-circuit the positive pulse of voltage which is fed through the coupling condenser 568 at the beginning of the letter decision pulse L′ so it has no effect on the reset line 100.

When the first storage circuit 91 is in the "1" condition, the triode 580 is in full conduction and the triode 580b is cut off. Thus, the voltage on the lead "*a*′" connected to the junction of the resistors 583 and 581 is higher than the voltage on the lead "*a*" connected to the corresponding junction of the resistors 583b and 581b.

In the control circuit 101 are a pair of triodes 602 and 602b, both connected as cathode followers. The voltage on the lead "*a*′" is fed through an isolation resistor 604 across a capacitor 606 to the grid of the triode 602, placing this triode in full conduction and developing a corresponding signal across its cathode resistor 608 shunted by a condenser 609. The lower voltage on the lead "*a*" develops a correspondingly lower signal across the cathode resistor 608b. These cathode voltage signals are fed through resistors 610 and 610b, respectively, to a pair of condensers 612 and 614 connected to the grids of the triodes 580a and 580c in the second storage circuit 92. A pair of neon bulbs 616 and 618 are connected in series between the resistors 610 and 610b.

Thus, when the first storage circuit 91 is in the "1" condition, the control circuit 101 places a more positive voltage at the terminal of the neon bulb 616 than at the terminal of the other one. Consequently, when the negative spike of shift voltage is applied by the shift line 110 through a resistor 620, it is the neon bulb 616 which is thrown into conduction, thus drawing a surge of current through the capacitor 612 and placing the triode 580a in full conduction. In this way, the "1" which was present in the first storage circuit 91 is shifted into the second storage circuit 92.

If the first storage circuit had contained "0," the relative voltages at the terminals of the neon bulbs 616 and 618 would have been reversed. In this case, the application of the negative spike of shift voltage would have placed the triode 580c in full conduction. In other words, the second storage circuit 92 would have been placed in the "0" condition.

The remaining storage circuits 93–97 are identical with the circuit 92 and their operation will be understood by those skilled in the art, accordingly they are shown schematically in block form to facilitate explanation and understanding.

The reason for the shunt condensers 606 and 606b in the grid circuits of the cathode followers 602 and 602b and for the shunt condensers 609 and 609b is to assure that the control circuit 101 delays slightly in its operation and so lags behind the changes in the first storage circuit 91. This provides enough time for the second circuit 92 to make the desired shift before the circuit 101 has "forgotten" the previous condition of the circuit 91.

The remaining shift control circuits 102–107 are all identical with 101 as will be understood. They are shown diagrammatically in block form in order to aid in explanation and understanding.

In order to generate a product function ($f'g'$) indicating when a "1" is in both of the storage circuits 96 and 97, the product generator 114 including dual triodes 622 and **622*b*** is utilized.

The grid of the triode 622 is connected by a lead 624 to the shift control circuit 106. The point of connection in the circuit 106 is at the junction point corresponding to the point in the circuit 101 where resistor 604 and condenser 606 join the grid resistor 7. The grid of the triode **622*b* is connected by a lead 626 to the corresponding junction point in the circuit 107**.

This circuit 114 is connected as a cathode follower with the output $f'g'$ taken across a cathode load resistor 628 shunted by a condenser 629 and fed into the conversion matrix 140.

DETAILED DESCRIPTION OF LETTER COUNTER CIRCUIT 120

In the letter counter circuit (FIGURE 2C) are six individual binary counter circuits 121–126, respectively, of which the first and fourth are shown in detail. They are all indentical, except the first, and each includes a dual triode 630, **630*b* which is cathode-coupled by a common resistor 632. This counter circuit 120 is controlled by a counter input pulse former circuit 116 including a triode 634 having equal gird return and cathode resistors 636 and 638, respectively. Letter decision pulses L′ are coupled to the grid of the triode 634 through a coupling condenser 640 while word decision pulses W′ are coupled through a condenser 642 to its cathode. Its anode is connected through a lead 644, across a grounded resistor 646, through neon bulb 647 and through a condenser 648*b* to the grid of the triode 630*b*. This grid is connected to a voltage divider circuit including three resistors 650*b*, 652*b*, and 654*b* connected from B+ to the letter counter reset lead 134. The lead 644 is also coupled through a neon bulb 656 and a condenser 648 to the grid of the triode 630**.

Assuming that the counter circuit 120 has just been set back to zero by a negative reset pulse, then the triode 630 is conducting and conduction through the other one is cut off. When a letter decision or dash decision pulse initiates full conduction through the triode 134, conduction through the triode 630 is stopped, and the triode **630*b* is placed in full conduction, indicating a count of 1. The next letter or word decision pulse, again places the first triode 630 in full conduction, indicating a count of 2. At the same time, the sudden drop in voltage on a lead 658 connected to the anode of the triode 630 is coupled through a condenser 660 into the second counter 122 switching the conduction through the triodes therein from the first to the second one. This condenser is connected at the point corresponding to the junction of the resistor 646 and the neon bulbs 656 and 647 in the circuit 121. The only difference between the first counter 121** and the others is that it does not have such an input coupling condenser.

After two more decision pulses on either of the leads 73 or 77 have again switched the conduction through the triodes 630 and **630*b* over and back again, the resulting negative pulse on the lead 658 switches conduction in the circuit 122 from the second triode back to the first, and switching the conduction in the third counter circuit 123** over to the right half, indicating a count of four, and so forth.

When a count of 64 is reached, the conduction in the triodes in the last counter 126 switches from the second one back to the first, or left, one, causing a negative pulse of voltage which is fed over the lead 129.

At a count of 72 the conduction through the triodes **630*a* and 630*c* in the counter 124 switches back from the second one to the first one, causing a negative pulse of voltage on the lead 132**.

DETAILED DESCRIPTION OF MORSE TO TELEPRINTER CONVERSION MATRIX CIRCUIT 140

As used herein the term "matrix" (see FIGURE 2D) means a systematized interconnection of impedances with a number of inputs and outputs. In the matrix 140 the impedances 670 are non-linear, being in the form of neon lamps.

As shown, the matrix 140 includes input leads *a′*, *a*, *b′*, *b*, *c′*, *c*, *d′*, *d*, *e′*, *e*, *f′*, *f*, *g′*, *g* from the register 90 and an input lead $f'g'$ from the product generator 114. These input leads run vertical in FIGURE 2D and carry input voltages which are always at one of two discrete levels. For example, consider the pair of input leads "*a′*" and "*a*." Whenever a "1" is in the first storage circuit 91 the voltage on the lead "*a′*" is more positive than the voltage on the lead "*a*," and vice versa when a "0" is in the circuit 91.

These input leads (vertical) are connected by neon lamps 670 to selected ones of the transverse or intermediate leads (shown running horizontal), each of which is labeled at the right with the letters, numbers, or punctuation symbols with which it is operatively associated. Many of the intermediate leads are associated with two or more letters, numbers, or symbols, as indicated. Each of the intermediate leads is connected through a 330,000 ohm resistor 680 to the matrix return bus 165. These intermediate leads in turn are connected by neon lamps 670 to selected ones of seven output connections 141–147. Five of these output connections 141–147 extend the full length of the matrix and are energized through resistors 671, 672, 673, 674, and 675 from individually filtered and well regulated sources of B+ voltage.

All of the interconnections of the input, intermediate, and output leads will not be described line by line, since the drawing makes these connections so clear. Wherever a small circle is shown at the intersection of an intermediate lead with either an input or an output lead, it will be understood that a neon lamp is so connected.

In order to explain the operation of the matrix, assume that a Morse letter "*d*" has been received. Then the register 90 contains 0 0 1 1 0 0 0. Thus, the primed input leads "*c′*" and "*d′*" are more positive than the unprimed leads "*c*" and "*d*," and the unprimed leads "*a*," "*b*" and "*e*," "*f*" and "*g*" are more positive than the corresponding primed leads. The $f'g'$ product is always at a low voltage for a Morse character having four or fewer elements; it is at a high voltage for a five-element or six-element Morse character.

The teleprinter character for the letter D is 1 0 0 1 0. Remembering that the output voltages on the first and third output leads 141 and 143 are reversed, to give an upper case S (warning bell) when strange Morse characters are received, it will be understood that the translated teleprinter character for D is 0 0 1 1 0.

The only intermediate lead which is associated with the letter D is seen to be the horizontal lead which is fifth from the bottom and has the label DG, which shows that this intermediate lead also is associated with the letter G.

When the negative return pulse is applied to the return bus 165, it lowers the voltage on the transverse line DG, because all of the input leads (namely, *a′*, *c*, *d*, *e′* and $f'g'$) which are coupled through neon lamps to this intermediate line DG are at a low voltage. The isolation resistors 671–675 between the B+ source on the five output lines have a higher resistance than the resistors 680, and so the negative matrix return pulse is able effectively to lower the voltage on these output leads. The sixth and seventh output lines 146, 147 are energized from the B+ source through resistors 676 and 677, respectively. None of the other transverse lines meet this criterion. For example, the voltage on the bottom transverse line A cannot drop to a lower value because the higher voltage on the two input lines "*a*" and "*d'*" acting through their corresponding neon lamps maintains the higher value on the transverse line A. Similarly, at least one neon lamp connects all of the other transverse lines with one of the more positive input leads: *a, b, c', d', e, f, g*. (This is the voltage input pattern to the matrix corresponding to the letter D in the register 90.)

Thus, the intermediate lead DG is the only one on which the voltage drops. This intermediate lead DG is connected by two neon lamps with the output leads 143 and 144, and so the voltages on the third and fourth output lines 143 and 144 drop. This corresponds to the teleprinter character 0 0 1 1 0, for a drop in voltage corresponds with a "1" in the matrix output.

The reason that in certain cases more than one intermediate lead is associated with a single symbol is advantageously to distribute the electrical load more or less evenly among the neon lamps and for maintaining the current through them at a relatively low value, insuring long operating life. For this reason, none of the intermediate leads are connected to more than two of the output leads 141–147, thus no intermediate (transverse) lead is required to pull down the voltage on more than two output lines.

For example, assume that a period symbol "." has been received. The register 90 then contains 1 0 1 0 1 0 1. Thus, the following input leads are at a higher voltage: *a', b, c', d, e', f, g'*.

There are two transverse lines, in the upper group, associated with the period symbol (.), and it is seen that these two transverse lines are the only ones which drop in voltage when the negative matrix return pulse is applied. The upper transverse period (.) lead has a pair of neon lamps connected to the output lines 141 and 144, and the lower transverse period lead has one connected to the output line 145.

The teleprinter character for a period (.) is 0 0 1 1 1. Remembering that the first and third elements are inverted, this becomes 1 0 0 1 1, which is the character produced by these neon lamp connections from the two transverse lines to the first, fourth and fifth lines 141, 144, and 145.

Below the lower transverse period (.) lead are three transverse leads $\overline{BT}$, $\overline{SK}$, $\overline{AR}$, which are the Morse symbols for heading, end-of-transmission, and end-of-message, respectively. These three lines actuate the seventh output line 147 to produce line feed and carriage return teleprinter characters.

The six lowest transverse lines in the upper group of the matrix are labelled, as follows: 6 Marks; 5 Marks; $\overline{AA}$; $\overline{MM}$, $\overline{MN}$; $\overline{IM}$, Blank. These are connected by neon lamps to the sixth output line 146 to produce a teleprinter case shift character, often called the "Figs Shift" character for convenience. The reason that the "6 Marks" and "5 Marks" lines are included is that all Morse letters are transmitted by only four marks, but the punctuation, numbers, and special symbols (which require a case shift on a teleprinter) are transmitted by five or six marks. The others are unused Morse characters which generate an S character and require a case shift to make this into a warning bell character.

This particular matrix arrangement has advantages in that the number of neon lamps, which are NE–2 type bulbs, is relatively small considering all of the conversions which are obtained, and the load imposed on the lamps is small, leading to a long operating life.

DETAILED DESCRIPTION OF MEMORY INPUT CONTROL CIRCUITS

The positive-going letter decision pulses L' are fed by a lead 135 through a coupling condenser 690 into the matrix read out control circuit 162 including a triode 692 and a pair of saturable transformers 694 and 696 in its anode circuit which have their primaries connected in series to B+, with a filter condenser 698 connected from B+ to the grounded cathode. The secondary windings are connected in series, with one being connected to a negative source 700, of approximately —50 volts, which is also connected through a resistor 702 to a grid isolating resistor 704. The secondary windings of these two pulse transformers are so proportioned that the upper one 696 saturates and delivers a positive 500 microsecond pulse and then the lower one 694 saturates and delivers a positive 500 microsecond pulse. Both of these pulses are led by the lead 163 across a grid return resistor 706 connected to B— and to the control grid of a pentode 708 in the matrix return pulse generator circuit 164. These pulses cause the pentode 708 to conduct heavily for 1,000 microseconds, generating a 1,000 microsecond negative matrix return pulse in its anode circuit, which is coupled through a capacitor 710 and across a grounded resistor 711 to the return lead 165. The anode of the pentode 708 is energized from B+ through a choke 712. The screen voltage for the tube 708 is supplied through a lead 714 across a filter condenser 716 and a voltage dividing resistor 718.

After the triode 692 has ceased conducting, the saturable transformers 694 and 696 are driven back to their initial magnetic states by a small steady reverse current which flows from B— through the resistor 706 and the lead 163.

In order to read out the output from the matrix, the second 500 microsecond pulse is fed from the transformer 694 through a lead 720 to the control grid of a pentode 722 in the read-out pulse generator circuit 166, having its cathode grounded and its anode supplied from B+ through a load resistor 724. A filter condenser 726 is connected from B+ to ground, and the screen voltage is supplied from B+ through a dropping resistor 728. The pentode 722 conducts heavily and generates a negative read-out pulse which is conducted by the lead 167 through cathode resistors 730 to the cathodes of the dual triode comparison tubes 731, 732, 733, 734, 735 and 736 in the six read-out amplifiers 171, 172, 173, 174, 175, and 176, respectively, and through a lead 738 to the cathode of a triode 740 in the gated read-out amplifier 177. The first and third read-out amplifiers 171 and 173 are identical, and are similar to the second, fourth, and fifth read-out amplifiers 172, 174 and 175 except that their grid connections are reversed. This compensates for the fact that the voltages on the first and third output lines 141 and 143 are inverted so as to generate an upper case S (warning bell character) whenever a strange Morse character is received. The anodes of the dual triodes 731–5 are coupled together through the primary windings of pulse transformers 741, 742, 743, 744, and 745, each primary being shunted by a resistor 746, as shown. The left side of these primary windings are directly connected to B+, and the left or right grid is biased positively by B+ voltage fed through an isolating resistor 747 or 748, as the case may be to establish the initial saturation of the transformers.

The right grids of the dual triodes 731 and 733, and the left grids of the dual triodes 732, 734, and 735 are connected through a common lead 168 to the sliding contact 750 on a potentiometer 752 which serves as a read out reference voltage source and has a grounded filter condenser 753. This potentiometer is connected in series with voltage dropping resistors 754 and 756 between B+ and ground. The other grid of each of these dual triodes is connected to the matrix output leads 141–145, respectively.

During the read out pulse, if the voltages on the right-hand grids of the dual triodes 731–735 are below the voltages on the corresponding left-hand grids, then there is no current through the primary windings of the transformers 741–5, and hence no output from their secondaries. These secondaries are connected through crystal rectifiers 758 and pairs of leads 759, 760; 761, 762; 763, 764; 765, 766; and 767, 768, respectively, to the input windings (FIGURE 2E) 771, 772, 773, 774, and 775 of the magnetic memory units 201–205 in the magnetic memory circuits 200 shown in FIGURE 2E. If the voltage on any of the output leads 141–5 remains above the reference voltage, then the current through the associated dual triode switches, reversing the saturation of the associated transformer and delivering a pulse of current to the associated input winding of one of the magnetic memory units 201–205, putting it in the "1" condition.

Remembering that a high output voltage from the matrix is a "0," it is seen that "0's" are advantageously stored as "1's" in the magnetic memory.

The output from the five read-out amplifiers 171–175 corresponds to a normal teletype code pattern, the inversion in the first and third matrix outputs 141 and 143 is compensated for by the first and third read out amplifiers 171 and 173.

In order to determine whether an upper or lower case character is intended to be printed, the sixth read-out amplifier 176 (FIGURE 2F) includes a dual triode 736 having its cathodes connected through a cathode resistor 782 to the read out pulse bus 167. The anodes of the dual triode 736 are coupled together through the primary of the case storage transformer 186 which has a center tap connected to a suitable source 790 of negative voltage.

This negative voltage source 790 is a triode 792 (FIGURE 2J) shown for convenience with the space character generator circuit 220. As shown, the triode 792 is connected as a cathode follower and has its anode connected to B+. Its cathode is connected through a resistor 794 to B—, and the grid is connected to a voltage divider network comprising a resistor 796 connected to B— and a resistor 798 connected to ground, with a filter condenser 800 connected from the cathode to ground. The output voltage at the terminal 790 is a very well regulated voltage of —50 volts. A number of other components in various circuits are also connected to the source 790, as mentioned from time to time hereinafter.

In the case read-out amplifier (FIGURE 2J) the dual triode 736 has one of its grids connected to the read-out reference voltage bus 168 and the other grid is connected to the matrix output lead 146.

When a shift is to be made from "lower" case to "upper" case (i.e. from letters to figures, punctuation and symbols) the voltage on the lead 146 drops. If the teleprinter was previously printing letters, this reverses the saturation of the core of the case storage transformer 186. This case storage transformer has a large amount of hysteresis and always retains its previous magnetic state unless the voltage on the lead 146 has changed, indicating a case shift. Advantageously, the case storage transformer serves to "remember" the condition of the teleprinter and only generates a shift character when it is necessary to shift the teleprinter carriage. Thus, assuming that the teleprinter was printing letters, then when the voltage on the lead 146 drops, the transformer saturation is reversed by the dual triode 736 and a pulse is produced by the secondary of the transformer of such polarity as to drive the grid of the triode 786 (FIGURE 2J) in the figures pulse amplifier 209 up to zero. This triode 786 conducts heavily and stores a figures shift teleprinter character in the second row of the memory, as explained next.

The teleprinter character for a "figures" shift is 1 1 0 1 1, that is, a mark in the first, second, fourth and fifth position, with a space in the third position. Because teleprinter characters are stored in the magnetic memory 200 in inverted form, the figures shift character is stored by putting a "1" only in the third memory unit 203*a*.

In order to explain the storage of the figure shift character, it is necessary to understand more fully the operation of the memory units (FIGURE 2E) in the magnetic memory circuits 200. All of these memory units are the same. The rows are shown in horizontal alignment here for convenience. There are five memory units each in the first ten rows and six each in rows eleven and twelve. Each unit, for example consider the unit 201 at the left in row I, includes a saturable core, diagrammatically shown, with three windings on it. The input winding is shown at the upper right of each core, and, in this unit 201, has the reference numeral 761. When a pulse of current is sent through the input winding, it serves to reverse the direction of magnetic saturation of the core. The advance winding is shown at the upper left of each core, and in the unit 201, the advance winding has the number 801. When a pulse of current is sent through the advance winding in the appropriate direction, it returns the core to its initial direction of magnetization. The output winding is shown below each core, and in the unit 201, is numbered 811. A pair of crystal rectifiers and a current limiting resistor are connected to each output winding. One rectifier is in series with each output winding and one is in shunt. In the unit 201, the series rectifier is 821 and the shunt rectifier is 831. The resistor, shown as 841 in the unit 201 is also in series with the output winding.

During the time that a pulse in the input winding 761 is changing the magnetization of the core of the unit 201 no current flows from the output winding 811 because it is blocked by the series rectifier 821. When the advance pulse in the winding 801 reverses the magnetization of this core, a pulse of current flows from the output winding 811 through the resistor 841 to the input winding (not shown) of the corresponding unit 201*a* in row II. The reason for the shunt rectifier 831 is to prevent the input winding of the unit 201*a* from affecting the output winding 811 when an advance pulse reverses the magnetization of the unit 201*a* and advances the datum to the unit 201*b*. In this way a "1" is advanced from unit to the corresponding unit in the next row, and so forth. The resistor 841 limits the current flow through the shunt rectifier 831 when an advance pulse is sent to the unit 201*a*. Thus, resistor 841 prevents the rectifier 831 from interacting with the input winding of the unit 201*a* and producing a short-circuited winding effect, which would hinder the desired rapid reversal of magnetization of the unit 201*a*.

When no input pulse has been fed to a unit, the unit remains in its initial state of magnetization, i.e. in the "0" state and so no output is produced when an advance pulse is fed to the unit. Thus, a "0" is stored in the next row.

As mentioned above, the "figures" shift character is stored in inverted form in row II by sending an input pulse to the unit 203*a*. The circuit for sending this pulse to unit 203*a* is traced from the B+ terminal 819 (FIGURE 2J) shown at the lower right in the memory stage full set control 208 through a lead 852 and a resistor 854 and then through a lead 856 to the anode terminal 816 (upper left in FIGURE 2J) of the triode 787, which is not conducting. This terminal 816 is connected by a lead (not shown) to the terminal 816 (FIGURE 2E), as indicated, which is connected to the input winding of the memory unit 203*a*. The circuit is completed from the terminal 817 (FIGURE 2E) back through another lead (not shown) to the anode terminal 817 (FIGURE 2J) and then through the triode 786 to ground, for this triode has been placed in conduction by the case storage transformer 186, as explained above. A resistor 858 in series with a capacitor 860 is connected across the secondary of the case storage transformer to improve the shape of the output pulses from the case storage transformer 186.

As mentioned above, whenever a character is placed in one of the rows of the memory, it is necessary to set the associated advance control (FIGURE 2E) into the "full" condition. Thus, when the figures shift character is placed in unit 203a in row II, the second advance control 252a must be set to the "full" condition. This is done by a rectifier 860 (FIGURE 2J) in the external full set combining network 210. When the figures pulse amplifier triode 786 conducts, it draws current through the rectifier 860, through a lead 862, and through a resistor 864a (FIGURE 2E) from B+. This drops the voltage at the anode of the triode 866a in the second advance control 251a, which sets this second control in the "full" condition, as explained later.

The external full set combining network 210 has the function of setting the appropriate advance control 251, 251a, or 251b in the full condition whenever one of the special teleprinter characters such as "figures" or "letters" shift, carriage return, or line feed is placed in the memory 200. The rectifier 870 in the external full set combining network has the purpose of preventing any conduction through the lead 788 to the anode of the triode 786, which would set the 3rd advance control in the "full" condition, which, of course is not desired when a "figures" shift character is placed in the second row.

When a character is received which requires a shift back from "figures" to "letters," the voltage on the matrix output lead 146 is high, causing the right half of the dual triode 736 to conduct, which reverses the magnetization of the case read-out transformer 186 and causes the triode 787 to conduct.

The teleprinter character for a "letters" shift is five marks, which is inverted and stored in the second row of the memory circuit 200 as five "0's" that is, no input pulse is fed to any of the units in row II. However, it is necessary to set the second advance control 251a into the "full" condition. This is done by conduction of current from B+ through the resistor 864a, the lead 862, the rectifier 860, the lead 856 to the conducting triode 787, which completes the circuit to ground. This drops the voltage on the anode of the triode 866a, and thus places the second advance control 251a in the "full" condition, as explained in detail later.

In order automatically to produce page copy, the 64-letter pulse is fed by the lead 129 through a condenser 880 (FIGURE 2J) and across a resistor 882 connected to the −50 v. supply terminal 790 and through a grid leak resistor 884 to the grid of a triode 886 in the 64-letter pulse amplifier 225. This causes the triode 886 to conduct, drawing a pulse of current from B+ at 888 (FIGURE 2J) through the upper half of the primary of the new line storage transformer and through the anode load resistor 890. This new line storage transformer 226 has a high degree of hysteresis so that it delivers an output pulse only when its magnetic state is changed. The pulse of current from B+ at 888 changes the magnetic state of this transformer and produces output current pulses in the secondaries 892 and 894, which are arranged to have no immediate effect upon the operation of the remainder of the circuits because it is not desired to shift the carriage at a count of 64. Instead, the apparatus advantageously awaits the first word space after a count of 64 is reached. The output from the secondary 892 is short-circuited by a rectifier 896. To improve the shape of pulses from the secondary 894, a resistor 897 and a condenser 898 are connected in series across it. Any output from the secondary 894 appearing on the lead 232 serves to drive both grids of the triodes 900 (FIGURE 2J) and 902 in the carriage return and line feed generator 192 more negative, so no output is generated by the CRLF generator 192. These grids are already biased negatively by conduction from the supply terminal 790 (see the upper right of FIGURE 2J) through a rectifier 904 and a lead 906 to the secondary 894.

Now that the magnetic state of the transformer 226 advantageously has been reversed, carriage return and line feed characters can be generated. The appearance of a word decision pulse W′ on the lead 212, which is fed through a coupling capacitor 908 (FIGURE 2J) and across a resistor 910 and through a grid leak resistor 912 to the grid of a triode 914 in the word space pulse amplifier, causes a pulse of current to be drawn from B+ at 888 through the lower half of the new line storage transformer 226 and through a lead 916, the primary 918 and a load resistor 920 and through the triode 914 to ground.

Thus, the magnetization of the new line storage transformer 226 is returned to its initial state, driving both grids of the triodes 900 and 902 positive, which generates both the carriage return and line feed characters, as explained below.

Figure 2E:
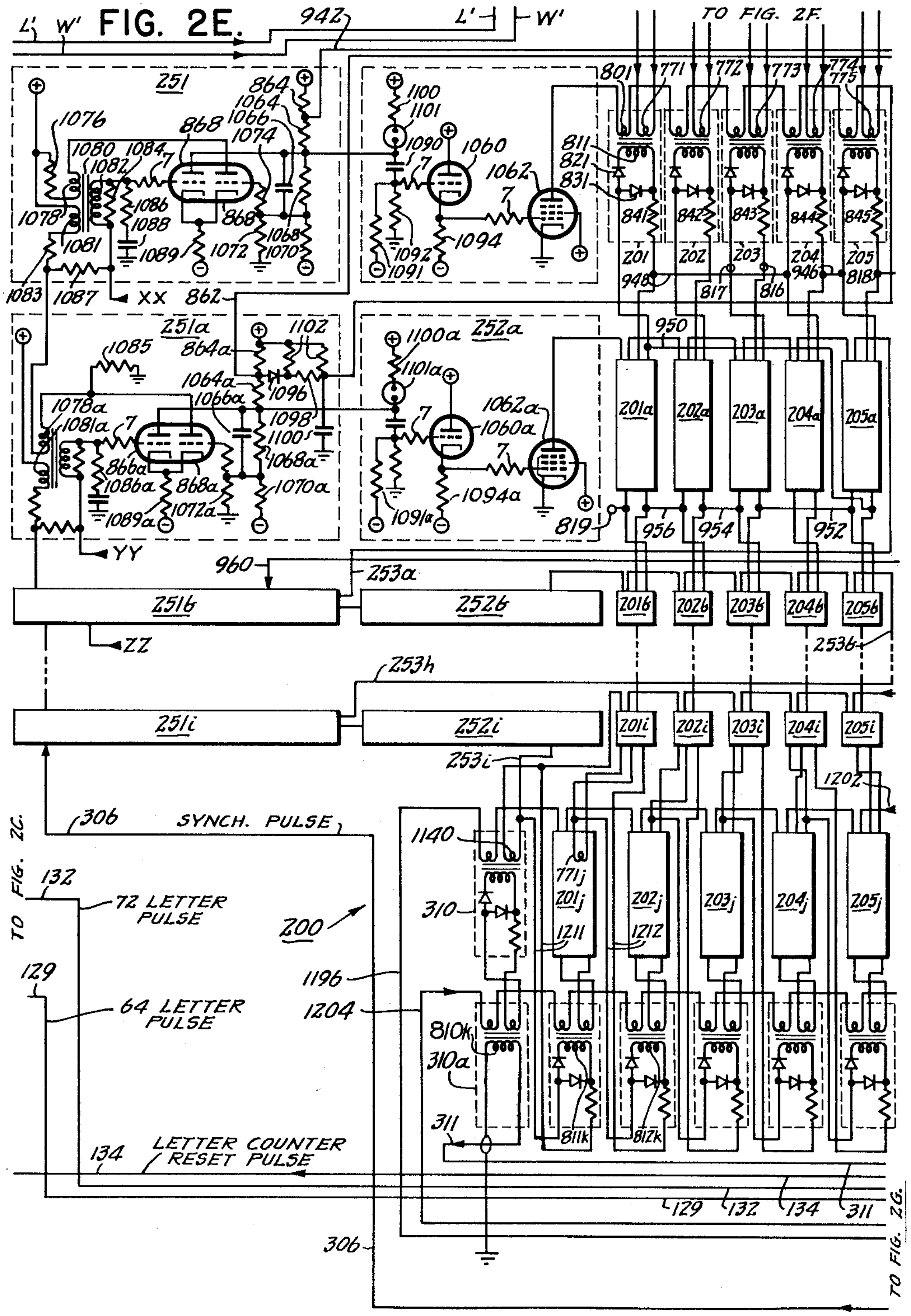
Figure 2F:
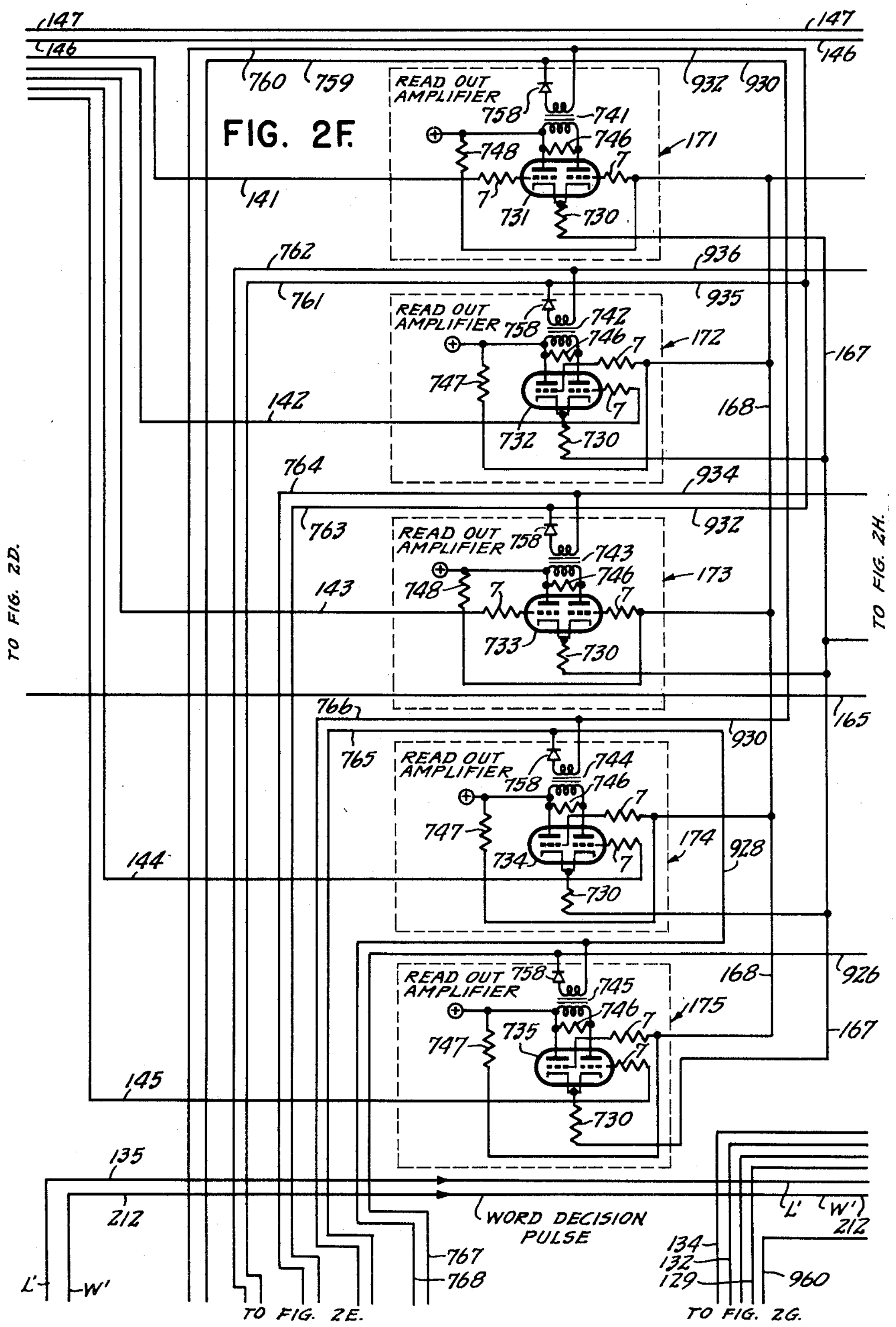

The teleprinter character for a carriage return (CR) is 0 0 0 1 0, which is inverted and placed in the third row of memory as 1 1 1 0 1, i.e. with an input pulse to the units 201b, 202b, 203b, and 205b. The teleprinter character for a line shift is 0 1 0 0 0, which is inverted and stored in the first and second rows of the memory as 1 0 1 1 1, that is, input pulses are sent to units 201, 203, 204, and 205 and to 201a, 203a, 204a, and 205a. To generate and store these characters in the memory, the triodes 900 and 902 are thrown into conduction, as explained above. The triode 902 completes a circuit starting from B+ at 850 (lower right in FIGURE 2J) through a resistor 922, through a short lead 924, then through a lead 926 which connects to the lead 767 and through the input winding 775, then through the lead 768 and through a jumper lead 928 to the lead 765, and through the input winding 774, then through the lead 766 and through a jumper lead 930 to the lead 759, through the input winding 771, back through a lead 76 to a jumper lead 932, and finally through the lead 763, winding 773 and then through the lead 764 back to a lead 934 which connects to the anode of the triode 902 (FIGURE 2J). Thus, the inverted line feed character 1 0 1 1 1 is stored in row I. It will be noted that although the lead 934 is connected by a short lead 935 to the lead 761, no current can flow through the input winding 772, because the lead 762 is connected through a lead 936 only to the anode of a triode 938 (shown just above the center of FIGURE 2J) in the space character generator circuit 220. This triode is rendered non-conducting by a negative pulse supplied by a lead 940 from the secondary 892.

At the same time as the line feed character is stored in row I, the advance control 251 (FIGURE 2E) is placed in the "full" condition. This is done by dropping the voltage at the anode of the triode 866, which is caused by conducting current from B+ through a resistor 864 and through a lead 942 which runs into the first memory full set control 208 through a rectifier 944 and joins the lead 924. The circuit from lead 924 through the triode 902 to ground was explained just above.

This circuit is advantageously arranged to produce double-spaced page copy. Thus, a line feed character is also stored in row II of the memory, by feeding input pulses to the units 201a, 203a, 204a, and 205a, corresponding with the inverted line feed character 1 0 1 1 1. At the same time the inverted carriage return character 1 1 1 0 1 is put into row III of the memory by sending pulses to the units 201b, 202b, 203b, and 205b. Both these LF and CR characters are generated by conduction through the triode 900 (FIGURE 2J) in the CR and LF generator 192. The circuit is traced from B+ at 850 through the following elements: resistor 854, lead 856, anode terminal 816, through the input winding of unit 203a, back to the anode terminal 817, then through lead 788 and rectifier 870 to the point 818 which connects from the external full set combining network 210 through a lead (not shown) to a point 818 (FIGURE 2E at the upper right). From this point 818 the circuit continues through the input winding of unit 205a, a jumper lead 946, the input winding of unit 204a, a jumper lead 948 and through the input winding of unit 201*a*. Thus far, this circuit has placed a line feed character in row II.

*Generation and storage of carriage return teleprinter character*

In order to store an inverted carriage return character in row III of the memory, this input circuit continues on from the input winding of the unit 201*a* through a lead 950 which goes back to the input winding of unit 205*b*, then through a jumper lead 952 and the input winding of unit 203*b*, then through a jumper lead 954 and the input winding of the unit 202*b*, and through a jumper lead 956 to the input winding of the unit 201*b* to the terminal point 819. Thus, an inverted carriage return character is placed in row III. The circuit is completed from the terminal point 819 through a lead (not shown) to the anode of the triode 900 (FIGURE 2J) in the CR and LF generator.

At the same time that the LF and CR characters are placed into rows II and III, respectively, the advance controls 251*a* and 251*b* are set into the "full" condition. The control 251*a* is set "full" by dropping the anode voltage of the triode 866*a* as a result of conduction from B+ through the resistor 864*a* and the lead 862, and through the rectifier 860 to the lead 856, which is connected by the triode 900 to ground by means of the circuit described above. The control 251*b* is set "full" by similar action by conduction through a lead 960 and through a rectifier 962 (FIGURE 2J) in the external full set combining network 210 to the point 818. The circuit from the point 818 to ground was described above.

As soon as the carriage return character is generated and while it is being stored in the memory 200, the letter counter 120 is desirably reset back to zero ready to count up to 64 again. When the triode 900 conducts, it discharges a condenser 964 through a rectifier 966, sending a negative pulse back over the lead 134, which is connected to all six of the binary counter circuits in the counter 120 and sets them all back to their initial condition.

The grids of the triodes 900 and 902 are normally biased about 50 volts negative by connection through the lead 232, winding 894, lead 906, and rectifier 904 connected to the negative supply terminal 790.

*Generation and storage of word space teleprinter character*

Each word decision pulse normally causes the word space pulse amplifier 214 to place a teleprinter space character in the memory circuit. The teleprinter character for a space is 0 0 1 0 0, which is stored in the memory 200 in inverted form as 1 1 0 1 1 in the first row of the memory. A word decision pulse causes current to flow through the primary 918 causing a pulse of current to flow from the secondary 968 through a lead 228, through the winding 892 and through a lead 940 driving the grid of the triode 938 positive and placing this triode in conduction. A circuit is thus completed from B+ and 850 in the external full set combining network, through the following circuit elements: resistor 922, lead 924, lead 926, lead 767, winding 775, lead 768, jumper lead 928, lead 765, winding 674, lead 766, jumper lead 930, lead 758, winding 771, lead 760, jumper lead 932, lead 935, lead 761, winding 772, lead 762, and lead 936 to the anode of the tube 938, which completes the circuit to ground. Thus all of the input windings in row I are energized except the third one, 773, as is desired. The grid of the space character generator triode 938 is normally biased 50 volts negative by a circuit which is traced through lead 940, through primary winding 892, through lead 228, and through the secondary winding 968 to the negative supply terminal 790.

The grid of the word space pulse amplifier triode 914 is biased negatively by connection through the resistor 910 and a lead 972 to the negative terminal 790.

At the same time, the first advance control 251 is set "full" by conduction through the resistor 864, through the lead 942, and through the rectifier 944 to the lead 924. The circuit is completed from lead 924 through to the triode 938 to ground, as explained immediately above.

*Suppression of word spaces during carriage return*

In order to suppress the generation of a space character when carriage return and line feed characters are generated, because there is no need for a space before the next word since it will start at the left margin, the secondary 892 of the new line storage transformer 226 generates a voltage on the inhibit line 228 which opposes and cancels out the output from the secondary 968 of the word space pulse forming transformer.

In certain cases where the word being received is longer than eight letters, a count of 72 is reached without any word decision pulse appearing in the lead 212. When a count of 72 is reached, the fourth binary counter stage sends a pulse over the lead 132, through a coupling condenser 974 to the grid of a triode 976 in a delay one-shot multivibrator circuit including a triode 978. The triode 976 has its anode connected to B+ through a resistor 980 and both cathodes are connected through a common cathode resistor 982 to B−. A filter condenser 984 is connected from B+ to ground. The triode 976 is thrown into conduction, dropping its anode voltage. This voltage change is coupled through a condenser 986 across a grid return resistor 987 and through a grid leak resistor 988 to a grid of the triode 978, stopping conduction through the triode 978. This multivibrator produces a delay in order to give time for the characters in the first three rows of the memeory to advance out. After a very brief period of time these first three rows are empty, and the voltage across the condenser 986 has been built up by conduction through a resistor 990 from B+. The triode 978 suddenly jumps into conduction and cuts off the triode 976. The sudden rise in voltage at the anode of the triode 976 is coupled through the condenser 986 and through a lead 235 and through a coupling condenser 992 and a grid leak resistor 994 to the grid of a triode 996 in the pulse amplifier 236. Thus, the triode 996 conducts, drawing current through its anode resistor 998 and through a lead 215 and the lower half of the primary of the new line storage transformer, causing the CR and LF generator to operate.

The grid of the triode 996 is normally biased negatively by connection through a resistor 1000 to the lead 972.

*Operation of gated read-out amplifier when special Morse characters are received*

When one of the special Morse characters $\overline{\text{AR}}$, $\overline{\text{BT}}$, or $\overline{\text{SK}}$ is received, the voltage on the seventh matrix output 147 drops, causing operation of the gated read-out amplifier 177 (FIGURE 2J at the upper right). This negative pulse is coupled through a condenser 1002 and through a grid leak resistor 1004 to the grid of a triode 1006 whose anode voltage is supplied through a resistor 1008 from the comparison voltage lead 168. A positive pulse appears at this anode and is fed through a lead 1010 to the grid of a triode 1012 having its anode connected through a resistor 1014 to B+. Because its grid is positive, the arrival of the negative read-out pulse over the leads 167 and 738 causes the triode 1012 to conduct heavily, drawing current through the resistor 782 and dragging the cathodes of the dual triode 736 positive to inhibit any output from the case read-out amplifier 176, because it does not matter whether the printer is in upper or lower case. Conduction through the triode 1012 delivers a negative pulse by a lead 1016 and through a coupling condenser 1018 to the grid of a triode 1020, stopping conduction from B+ through a pair of anode load resistors 1022 and 1024. This delivers a positive pulse over the lead 906 through the winding 894 and to the CR and LF generator 192 and thus actuates this generator to produce two line feed and carriage return characters.

The grids of the triodes 740, 1006, and 1020, are returned to B+ through resistors 1026, 1028, and 1030, respectively. A filter condenser 1032 is connected between B+ and ground in the gated read-out amplifier circuit 177.

*Memory advance inhibitor operation*

Included in the memory input circuits, shown in FIGURE 2J at the lower left is a memory advance inhibitor circuit 1034 which is closely associated in operation with the external full set combining network 210 and includes a triode 1036 having its cathode connected to B−, a diode-connected triode 1038, and two other diodes 1040 and 1042 all having grounded cathodes.

The purpose of this inhibitor is to prevent any of the characters in the first three rows of the memory from being advanced to the next row until the external full set combining network 210 has completed its operation of "full" setting any of the advance controls 251, **251*a*, or 251*b***. This advantageously assures that the "full" setting operation of any of the first three rows is synchronized with the storing of a character in the associated row or rows.

From the above explanations of the generation and storing of the special teleprinter characters, it will be understood that among the advantages of the methods and apparatus described are those resulting from the fact that a character is always set into the first row of the memory whenever any character is set into the second or third row. In many cases the first row of the memory is the only one into which a character is being stored.

The operation of the inhibitor takes advantage of these relationships, for whenever the advance control 251 is being "full" set the voltage on the lead 926 is reduced. This reduced voltage is fed by a lead 1044 through a resistor 1046 and a coupling capacitor 1048 and across a grid return resistor 1050 to the grid of the triode 1036, cutting off its conduction. This allows the voltage on a bus 1052 from the anode of the triode 1036 to rise to zero. The anodes of the three diodes 1038, 1040, and 1042 are connected through three resistors 1054, 1056, and 1058, respectively, to the bus 1052, and also have connections YY, XX, and ZZ (not completely shown), respectively, to XX, YY, and ZZ (FIGURE 2E) in the grid circuits of the triodes 866 and **866*a*, and in the grid circuit of the corresponding triode in the advance control 251*b***.

Thus, the diodes 1036, 1040, and 1042 are enabled to clamp the voltage of these grid circuits at zero. This effectively prevents these three advance controls 251, **251*a*, and 251*b* from completing a cyclic change and thus prevents advancing the characters in rows I, II, or III. When the "full" setting of row I is complete, the voltage on the lead 926 rises and the inhibitor 1034** ceases operation, allowing the stored characters to advance.

*Detailed description of memory control circuits*

The memory control circuits shown at the left in FIGURE 2E operate to control the advance of stored characters from row to row through the memory 200 and to indicate when any given row is "full" and to prevent any attempt to store more than one character at a time in any row. These control circuits include ten advance controls of which 251 and **251*a* are shown in detail. The other eight advance controls 251*b*–251*i* are identical with 251*a*, and all of them normally operate as one-shot multivibrators except that the first three are briefly inhibited by inhibitor 1034 (FIGURE 2J) from completing their cycle whenever the advance control 251** is being "full" set.

Also included in the memory control circuits and located in the advance pulse amplifiers 252, **252*a*, etc. are ten triodes 1060, 1060*a*, etc. serving as cathode followers and ten pentodes 1062, 1062*a***, etc., acting as power amplifiers for delivering powerful advance pulses as desired.

For purposes of explanation, assume that the memory is empty. In operation, when a character is put into row I, a "full" set pulse draws current through the resistor 864. The reduction in voltage acts through a resistor 1064 and is coupled through a condenser 1066 shunted by a resistor 1068 connected by a resistor 1070 to B−. This reduction in voltage acts across a grounded grid return resistor 1072 and through a grid leak resistor 1074 to cut off conduction through the triode 868. The current for the triode 868 flows from B+ through a current limiting resistor 1076 and a primary winding 1078 of a transformer 1080.

When this current through the winding 1078 stops, the continued flow of current from B+ through another primary winding 1081 and through a resistor 1083 and the primary **1078*a* and past a voltage divider resistor 1085 to the anode of the triode 868*a* causes the saturation of the transformer to reverse. This causes the secondary 1082 to give a positive pulse of voltage to the grid of the triode 866, starting conduction through it and holding the voltage at the junction of the resistors 1072 and 1074 at about −10 volts. The secondary 1082 is shunted by a resistor 1084, with a resistor 1086 in series with a condenser 1088 connected from the grid to ground to improve the operation. The saturation time of the transformer 1080** controls the rate of operation of the multivibrator.

After the inhibitor 1034 (FIGURE 2J) has ceased operation, the negative voltage now appearing on the connection XX stops conduction through the left triode, causing the voltage at its anode to rise sharply. This rise in voltage is coupled through the condenser 1066 and again starts conduction in the triode 868.

This sharp rise in voltage is coupled through a capacitor 1090 and across a grid return resistor 1094 to the grid of the cathode follower 1060. The output across its cathode load resistor 1094 actuates the pentode 1062 to conduct a large pulse of current from B+ through a resistor **864*a*, through a rectifier 1096 and a resistor 1098, and through the advance lead 253 and through the five advance windings in row I. A condenser 1100 connected to the lead 253 serves to boost this advance pulse. The grid of the triode 1060 is normally biased negatively by connection through a resistor 1091** to B−.

Thus, the character is advanced to row II, and due to the sudden drop in voltage across the resistor **864*a*, the second advance control is set into the full condition by stopping conduction through the triode 868*a*, which stops conduction through the primary 1081**.

When the second memory row is "full," that is, when the left triode **866*a* is conducting, the advance control circuit 251*a* advantageously acts to prevent another character from being advanced from the first row. This is done by biasing the grid of the triode 866 at about zero, holding the triode 866 in conduction after it has been placed in conduction, thus preventing conduction from reverting to the triode 868, which prevents the generation of a positive pulse in the secondary 1082**.

As soon as the second row "empties," that is, as soon as the right triode **868*a* begins conducting, then current flows through the primary 1081, starting a positive pulse from the transformer secondary 1082 and biasing the lead XX to about −40 volts. Then, when the transformer 1080, the triode 866 cuts off, and conduction again shifts to the triode 868**, and the next character is advanced from row I to row II.

In effect the conduction of current through the primary 1081 is a signal that the "next row is empty." As the stored characters are advanced through the memory, the "next row is empty" signal proceeds from the rear of the memory toward the front of the memory at the same rate as the stored information is propagated from front to rear through the memory.

Now it will be understood that when the advance inhibitor 1034 serves to hold the points XX, YY, and ZZ in the grid circuits at zero and maintains conduction through the left triodes in the first three advance control circuits 251, 251*a*, and 251*b* which in turn prevents generation of any advance pulses until the "full" setting is complete.

When characters are placed in the second or third row, the conduction of current through the leads 862 or 960 respectively, causes the conduction to shift to the left triode, indicating that the row is "full."

It is to be noted that the screen grid of the pentodes 1062, 1062*a*, etc. are connected to a positive voltage source, indicated schematically in FIGURE 2E. This voltage source is provided by individual decoupling circuits connected to B+. These decoupling circuits each comprise a 4,700 ohm resistor (not shown) connected from the screen grid to B+, and a filter condenser of 1 microfarad (not shown) connected from the screen grid to ground. These decoupling filters are not shown here to make the drawing easier to read.

DETAILED DESCRIPTION OF MEMORY READ-OUT CIRCUITS

Figure 2G:
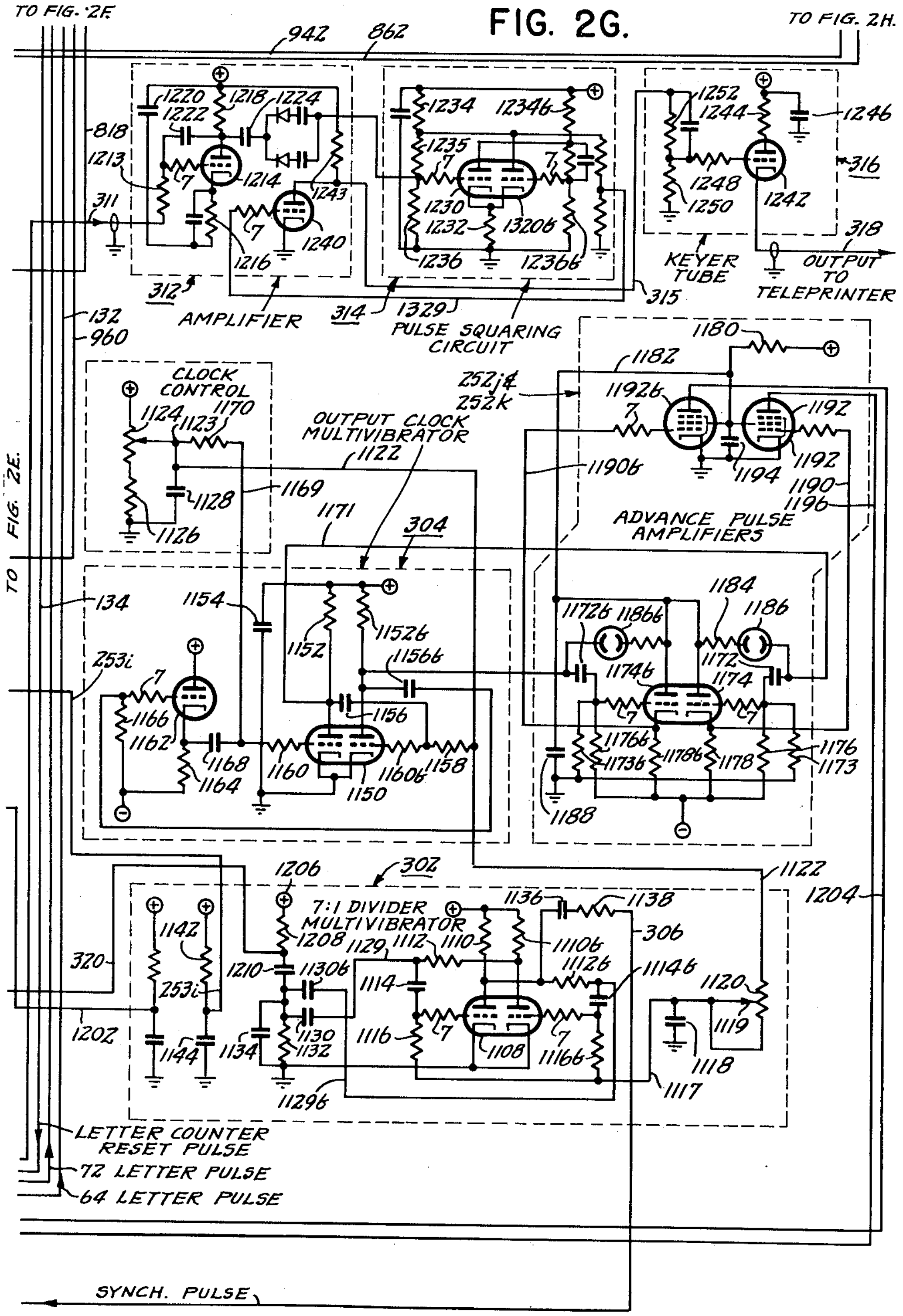
Figure 2H:
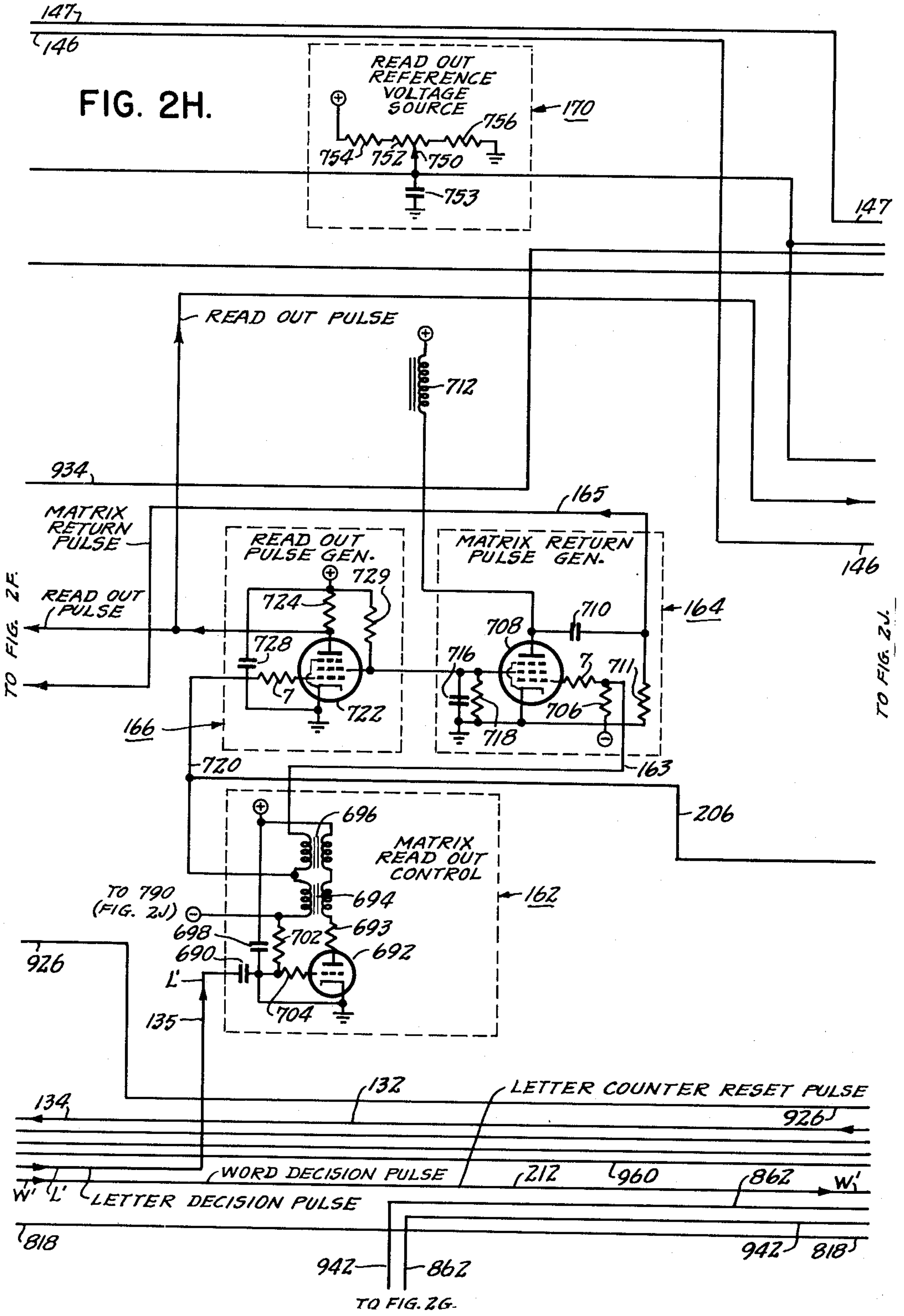
Figure 2J:
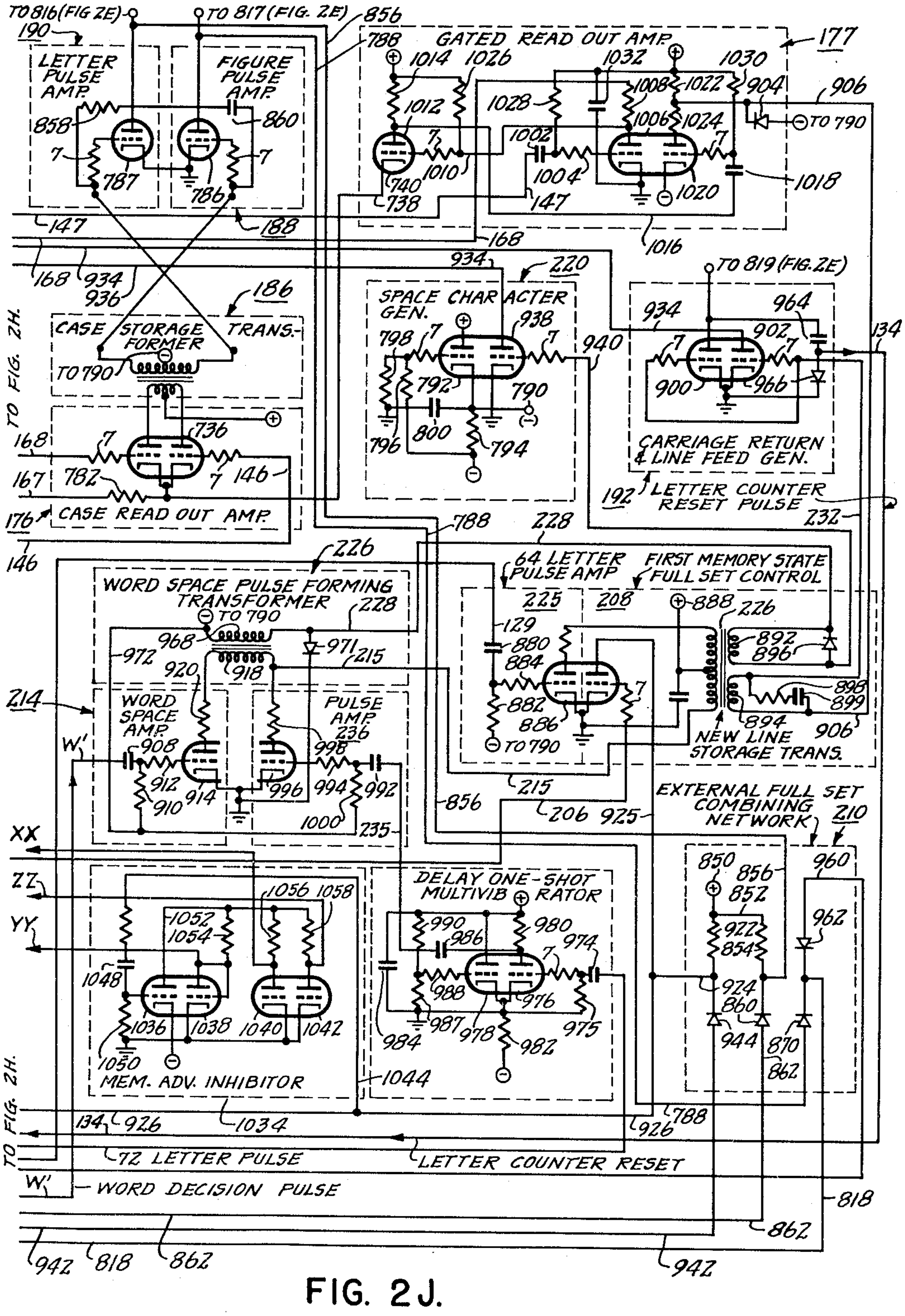

In order to read the inverted teleprinter characters out of the memory circuit 200 and to generate teleprinter characters, the memory read out circuits, shown in detail in FIGURES 2E and 2G are used.

The rate at which the stored characters are removed from the tenth row of the memory is controlled by a 7:1 divider multivibrator circuit 302 which sends advance pulses over a lead 306 to the advance control circuit 251*i*. These advance pulses serve as synchronizing pulses to obtain the proper time spacing of the elements of the teleprinter characters. This multivibrator includes a dual triode 1108 having its cathodes grounded and its anodes connected through load resistors 1110 and 1110*b* to B+. The anode of the right triode is coupled through a resistor 1112 and a capacitor 1114 to the grid of the left triode, and this left grid is biased positively by connection through a resistor 1116, a lead 1117 across a condenser 1118, and through a variable resistor 1120 through a lead 1122 to the adjustable contact of a potentiometer 1124 connected to B+ and through a resistor 1126 to ground. A condenser 1128 is connected between the lead 1122 and ground.

The junction of the resistor 1112 and the condenser 1114 is connected through a lead 1129 and through a condenser 1130 to a grounded resistor 1132 shunted by a condenser 1134.

In operation the conduction through the two halves of the triode 1108 shifts back and forth under the control of the output clock multivibrator 304. When the conduction through the left half of the dual triode 1108 is cut off, this causes a drop in voltage which is coupled through a condenser 1136 and a resistor 1138 and through the synchronizing lead 306 to the advance control circuit 251*i*. The lead 306 is connected to a primary winding corresponding to the winding 1081*a*. Thus, current is drawn through this winding causing the advance control circuit 251*i* to complete its cycle and initiate an advance pulse which is sent from the advance pulse amplifier 252*i* through a lead 253*i* which is connected with the input winding 1140 of the sixth memory unit 301 in the eleventh row and connects with the input windings of the five units in the tenth row. The lead 253*i* is connected to B+ at the lower left in FIGURE 2G through a decoupling resistor 1142, with a filter condenser 1144 connected to ground.

In this manner the synchronizing pulse on the lead 306 advances the character from the tenth row into the eleventh row and at the same time, places the unit 310 in the "1" condition. As mentioned before, this "1" in the unit 310 is later inverted and serves as the "start" pulse for the teleprinter character.

The output clock multivibrator 304 is operated at a frequency seven times that of the divider multivibrator 302. This clock multivibrator includes a dual triode 1150 having its anodes connected through resistors 1152 and 1152*b* to a B+ terminal with a filter condenser 1154 connected to B+ to ground. The anode of the left half of this dual triode is coupled through a condenser 1156 and through a resistor 1158 to the lead 1122. A resistor 1160*b* is connected between the grid of the right half of the dual triode and the junction of the condenser 1156 and resistor 1158.

In operation the conduction shifts back and forth between the two halves of the triode 1150. The anode of the right half of the dual triode 1150 is coupled through a condenser 1156*b* to the grid of a triode 1162 connected as a cathode-follower, with its anode connected to B+ and its cathode connected through a resistor 1164 to B−. A grid resistor 1166 is returned to B− and biases the grid negatively. The cathode is coupled through a condenser 1168 and a resistor 1160 to the grid of the left half of the dual triode, and the junction of the condenser 1168 and resistor 1160 is connected through a lead 1169 and a resistor 1170 to the movable contact 1123 on the potentiometer 1124.

In order to adjust the frequency of the output clock multivibrator 304 the contact 1123 is moved along the potentiometer. Moving the contact 1123 upward along the potentiometer 1124 applies a more positive voltage to the lead 1169 and increases the rate of this output clock multivibrator 304. For an output rate of 60 words per minute, this multivibrator 304 is set to a frequency of about 45 cycles per second.

In order to control the "free running" rate of the divider multivibrator 302 the contact 1119 is adjusted along the potentiometer 1120. This multivibrator 302 is adjusted to have a free running rate slightly slower than one-seventh the rate of the clock multivibrator, for example such as about 7 cycles per second, and then the clock multivibrator triggers it at the appropriate time every seventh clock cycle to produce a rate of about 6.5 cycles per second in the divider multivibrator. This trigger synchronizing circuit is explained below.

At 60 words per minute the output clock multivibrator has a frequency of 45 cycles per second, so that each cycle lasts about 22 milliseconds. In order to make the elements of the teleprinter character of proper duration, the cathode follower 1162 has the function of causing the left half of the dual triode 1150 to stop conduction only about 1 millisecond after the right half stops conduction, while 21 milliseconds more must elapse before the right half again stops conduction. When the left half of the dual triode 1150 ceases conduction, a positive pulse of voltage is fed from its anode by a lead 1171 and through a coupling condenser 1172 and then across a grounded grid return resistor 1173 to the grid of a triode 1174 connected as a cathode follower and forming part of the advance pulse amplifier for the eleventh row of the memory circuits. The grid is biased negatively by a resistor 1176 connected to B− and the cathode is connected to B− by a resistor 1178. The anode is energized from B+ through a resistor 1180 and a lead 1182, with a resistor 1184 in series with a neon lamp 1186 connected between the leads 1182 and 1171. A filter condenser 1188 is connected between the anode and ground.

Thus, a positive pulse appears across the cathode load resistor 1178 and is fed by a lead 1190 to the grid of a pentode 1192 having its screen grid connected to the B+ lead 1182 with a filter condenser 1194 connected to ground. The anode of this pentode is connected by an advance lead 1196 to the advance windings of the six memory units 310 and 201*j*–205*j* in the eleventh row of the memory. This positive pulse places the pentode 1192 in full conduction, completing a conduction path for the advance pulse which can be traced from B+ through a resistor 1198 and across a decoupling filter resistor 1200 and through a lead 1202 to the unit 205*j*. This path for the advance pulse is completed through the advance windings of the six units to the lead 1196.

Thus, an advance pulse is fed to the eleventh row of the memory about 1 millisecond after an advance pulse was fed to the twelfth row and serves to advance a character into row twelve.

The advance pulse amplifier for row twelve comprises the cathode-follower triode **1174*b* and the pentode 1192*b* and is coupled by an advance lead 1204 to the advance windings of the six units in row twelve. When the pentode 1192*b* is placed in conduction, a path for the advance pulse to the twelfth row is completed from B+ at 1206 in the circuit 302, through a resistor 1208 and a lead 320 to these six advance windings. This pulse of current through the resistor 1208 feeds a negative pulse through a coupling condenser 1210 to trigger the multivibrator 302 and keep it in synchronism with the clock multivibrator. At the same time, this advance pulse to row twelve causes the "1" in unit 310*a* to be fed through an output line 311 into an output amplifier 312, so as to form the "start" pulse. This is a momentary interruption of the positive voltage on the output line 318. Also, this advance pulse to row twelve causes the remaining character elements stored there to be returned to the tenth row, but being shifted one unit to the left (as shown). That is, the output winding 811*k* of the memory unit 210*k* is connected by a pair of leads 1211 to the input winding 1140 of the unit 310. The output winding 812*k* of the unit 202*k* is connected by a pair of leads 1212 to the input winding 771*j* of the unit 201*j***, and so forth.

Thus, advantageously, every seventh advance pulse to row twelve feeds out an inverted "start" pulse.

During the next five cycles of the output clock, the elements of the teleprinter character are shifted in succession over into the unit **310*a* and fed out by the lead 311. During the seventh cycle of the output clock all of the units of rows eleven and twelve are empty, producing no output on the line 311, which constitutes an inverted "stop" pulse for the teleprinter. This seventh advance pulse into row twelve is the one which is used to trigger the divider multivibrator. This causes the synchronizing pulse from the divider multivibrator to appear on the lead 306** and advances the next character from row ten to row eleven if the tenth row is full.

Thus, a character is delivered from row ten to row eleven and a "1" (for the "start" pulse) is placed in the unit 310 at the time that the seventh cycle of the output clock multivibrator sends an advance pulse to row twelve which finds row twelve to be cleared. Then, one millisecond later, when the advance pulse is fed from the left anode of the dual triode 1150 to row eleven, this character is advanced from row eleven into row twelve and a negative "start" pulse is transmitted by the shielded lead 311 through an input resistor 1213 to the amplifier 312 and the transmission of the next teleprinter character has begun, and so forth. As shown, the connections to the output side of the output unit **310*a* differ from all of the others, the output winding is connected directly to the output line 311** so as to deliver both positive and negative pulses, whenever the magnetic state of its core is changed in either direction.

The amplifier 312 includes a triode 1214 having a cathode resistor 1216 by-passed by a capacitor and has its anode connected through a load resistor 1218 to B+ with a filter condenser 1220 connected to ground. A capacitor 1222 is connected from the anode to the cathode to produce the desired pulse form at the anode.

The pulse is inverted by the amplifier 1214 and is coupled through a coupling condenser 1224 and by a suitable trigger blocking circuit including two rectifiers and condensers in parallel, as shown, to the grid of a triode 1230. The inverted pulse stops conduction through the triode 1230 which causes the flip-flop pulse squaring trigger circuit 314 to be set to the "0" or space state. The triode 1230 has a common cathode resistor 1232 with a triode **1230*b*, which is energized from B+ through a resistor 1234, and has its grid returned to ground by a resistor 1236*b*. This pulse-squaring trigger circuit is similar to those described above, and includes a resistor 1235 between the resistor 1234 and the grid of the triode 1230**.

When the next advance pulse is applied to the 12th row, removing the "1" from core **310*a*, a positive pulse appears at lead 311 which, through amplifier 1214 causes the flip-flop 314 to be set to the "1" or mark state. If the advance pulse to the eleventh row, which occurs one millisecond later, causes a "1" to be inserted in core 310*a*, a negative pulse appears at lead 311 which sets flip-flop 314 to the "0" state. If no "1" is inserted in core 310*a*, no pulse appears, and the circuit 314 remains in the "1" state. It can be seen that the flip-flop 314 is always in a state complementary to that of core 310*a***.

A squared negative pulse results at the anode of the triode **1230*b* whenever the circuit 314 is in the "0" state. This negative pulse is fed through a resistance voltage divider and by a lead 1238 to a triode voltage amplifier 1240 having its anode energized from B+ through a resistor 1242**.

The output from the amplifier triode 1240 on a lead 315 is arranged to turn off a keyer tube 1242 in a keyer circuit 316 whenever a "1" is fed from the unit **310*a*. The tube 1242 has its cathode connected to the output lead 318 and its anode connected through a resistor 1244 to B+ with a grounded filter condenser 1246. The grid is connected by a resistor 1248 to a voltage divider including a grounded resistor 1250 and a resistor 1252 connected to the lead 315** by-passed by an input capacitor.

Thus, the presence of a "1" in the output unit **310*a* turns off the keyer tube 1242 and produces a regular printer "start" pulse. As succeeding elements of the inverted teleprinter character are fed from the unit 310*a*** they are similarly inverted in the read-out circuits and thus advantageously operate a standard teleprinter. The automatic conversion from Morse code to teleprinter code is completed and suitable teleprinter characters have automatically been generated so that page copy results.

Note that during the one millisecond interval between pulsing row 12 and pulsing row 11 the core **310*a*** is always in the "0" state, causing a mark at the output, for this interval. This means that brief mark pulses appear between adjacent spaces, but these are so short as to have negligible effect on the printer equipment.

From the foregoing it will be understood that the methods and apparatus of the present invention described above are well suited to provide the advantages set forth, and since many possible embodiments may be made of the various features of this invention and as the methods and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. The method of automatically classifying the elements of a Morse code message as "dots" or "dashes" comprising the steps of receiving the elements of the Morse code message in time sequence, varying a first electrical signal as a predetermined function of the time duration of each element, comparing said first signal with a reference signal during the duration of each element, indicating the reception of a dash whenever said first signal has borne a first predetermined relationship to said reference signal during the duration of each element, adjusting a characteristic of said reference signal in a first manner whenever said first signal bears a second predetermined relationship to said reference signal at the cessation of an element which has been indicated as being a dash, adjusting said characteristic in a second manner whenever said first signal bears a third predetermined relationship to said reference signal at said cessation, and using said adjusted reference signal for comparison with said first signal during the reception of succeeding elements.

2. The method of automatically identifying the elements of a Morse code message as "dots" or "dashes" as set forth in claim 1 wherein an indication of the reception of a dot is made whenever said first signal has avoided said first predetermined relationship during the duration of an element.

3. The method of automatically classifying the elements of a Morse code message as "dots" or "dashes" comprising the steps of receiving the elements of the Morse code message in time sequence, varying a first electrical signal as a predetermined function of the time duration of each element, comparing said first signal with a reference signal during the duration of each element, indicating the reception of a dash whenever said first signal bears a first predetermined relationship to said reference signal during the duration of each element, adjusting a characteristic of said reference signal in a first direction whenever said first signal bears a second predetermined relationship to said reference signal at the cessation of an element which has been indicated as a dash, adjusting said characteristic of said reference signal in a second direction whenever said first signal bears a third predetermined relationship to said reference signal at the cessation of an element which has been indicated as a dash, indicating the reception of a dot whenever said first signal bears a fourth predetermined relationship to said reference signal at the cessation of each element, adjusting said characteristic in said first direction whenever said first signal bears a fifth relationship to said reference signal at the cessation of an element which has been indicated as a dot, adjusting said characteristic in said second direction whenever said first signal bears a sixth relationship to said reference signal at the cessation of an element which has been indicated as a dot, and using said adjusted reference signal for comparison with said first signal during the reception of succeeding elements.

4. The method of automatically classifying as "dots" or "dashes" the elements of a Morse code message regardless of changes in message speed comprising the steps of receiving the elements of the Morse code message in time sequence, varying a first electrical signal as a predetermined function of the time duration of each element, comparing said first signal with a reference signal during the duration of each element, indicating the reception of a dash whenever a coincidence occurs between a characteristic of said first signal and a characteristic of said reference signal during the duration of an element, indicating the reception of a dot whenever said coincidence is absent during the duration of an element, adjusting the characteristic of said reference signal in a first direction whenever a first portion of said first signal bears a first predetermined relationship to said reference signal at the cessation of an element classified as a dash, adjusting the characteristic of said reference signal in a second direction whenever said first portion of said first signal bears a second predetermined relationship to said reference signal at such cessation, adjusting the characteristic of said reference signal in said first direction whenever a second portion of said first signal bears said first predetermined relationship at the cessation of an element classified as a dot, adjusting the characteristic of said reference signal in said second direction whenever said second portion of said first signal bears said second predetermined relationship at the cessation of an element classified as a dot, and using said adjusted reference signal for comparison with the first signal during the reception of the succeeding element.

5. The method of automatically identifying the elements of a Morse code message as "dots" and "dashes" comprising the steps of receiving the elements of the Morse code message in time sequence, varying a first voltage as a predetermined function of the time duration of each element, comparing said first voltage with a reference voltage during the duration of each element, indicating the reception of a dash whenever a predetermined portion of said first voltage becomes equal to said reference voltage during the duration of an element, indicating the reception of a dot whenever said predetermined portion of said varied voltage remains different from said reference voltage during the duration of an element, adjusting said reference voltage in a first direction whenever a second predetermined portion of said first voltage differs in said first direction from said reference voltage at the cessation of an element indicated as a dash, adjusting said reference voltage in a second direction whenever said second predetermined portion of said first voltage differs in said second direction from said reference voltage at said cessation, and using said adjusted reference voltage for comparison with said first voltage during the reception of the succeeding element.

6. The method of automatically identifying the elements of a Morse code message as "dots" or "dashes" as claimed in claim 5 and wherein said reference voltage is adjusted in said first direction whenever a third predetermined portion of said first voltage differs in said first direction from said reference voltage at the cessation of an element indicated as a dot, and adjusting said reference voltage in said second direction whenever said third predetermined portion of said first voltage differs in said second direction from said reference voltage at the cessation of an element identified as a dot.

7. The method of automatically identifying the elements of a Morse code message as "dots" or "dashes" regardless of changes in message speed, comprising the steps of receiving the elements of the Morse code message in time sequence, linearly increasing a first voltage proportional to the time duration of each element, comparing said first voltage with a reference voltage during the duration of each element, indicating that the element is a dash whenever a predetermined portion of said first voltage has become equal to said reference voltage during the duration of each element, indicating that the element is a dot whenever said predetermined portion of said varied voltage has remained different from said reference voltage during the duration of each element, increasing said reference voltage when a second predetermined portion of said first voltage is larger than said reference voltage at the cessation of an element which has been indicated as a dash, decreasing said reference voltage when said second portion is smaller than said reference voltage at the cessation of an element which has been indicated as a dash, increasing said reference voltage when a third predetermined portion of said first voltage is larger than said reference voltage at the cessation of an element which has been indicated as a dot, decreasing said reference voltage when said third portion is smaller than said reference voltage at the cessation of an element which has been indicated as a dot, and using said adjusted reference voltage for comparison during the reception of the succeeding element.

8. The method for automatically identifying the elements of a Morse code message as "dots" or "dashes" as claimed in claim 7 and wherein said first predetermined portion is the inverse of the geometric mean of the relative time duration of dots and dashes and wherein said third predetermined portion is unity and wherein said second predetermined portion is the ratio of the relative time duration of dots divided by the relative time duration of dashes.

9. The method as claimed in claim 8 wherein said first port is $1/\sqrt{3}$, said third portion is 1 and said second portion is $\frac{1}{3}$.

10. The method of automatically identifying as "dots" or "dashes" the elements of a Morse code message comprising the steps of receiving the Morse code message in time sequence, delaying by a predetermined fixed time the arrival of each element at a predetermined point, varying a first signal as a predetermined function of the time duration of each element at said predetermined point, comparing said first signal with a reference signal during the duration of each element at said predetermined point, indicating by a second signal the reception of a dash when ever said first signal has borne a predetermined relationship to said reference signal during the duration of an element at said point, generating a third signal during the predetermined fixed time delay between the cessation of the reception of an element and the cessation of the same element at said point, indicating by a fourth signal the reception of a dot whenever said first signal has avoided said predetermined relationship during the duration of an element at said point, using said second dash-indicating signal to obtain a first selected characteristic of said first signal, using said third signal to initiate adjusting a characteristic of said reference signal in a first manner whenever said selected characteristic of said first signal bears a second predetermined relationship to said reference signal, using said third signal to initiate adjusting said characteristic of said reference signal in a second manner whenever said selected characteristic of said first signal bears a third predetermined relationship to said reference signal, and using said adjusted reference signal for comparison with said first signal during the duration of succeeding elements at said point.

11. The method of automatically identifying as "dots" or "dashes" the elements of a Morse code message as claimed in claim 10 and wherein said fourth dot-indicating signal is used to obtain a second selected characteristic of said first signal, using said third signal to initiate adjusting said characteristic of said reference signal in a first manner whenever said second selected characteristic of said first signal bears said second predetermined relationship to said reference signal and using said third signal to initiate adjusting said characteristic of said reference signal in a second manner whenever said first signal bears said third predetermined relationship to said reference signal.

12. The method of automatically identifying as "dots" or "dashes" the elements of a Morse code message regardless of changes in message speed comprising the steps of receiving the Morse code message in time sequence, delaying by a predetermined fixed time the arrival of each element at a predetermined point, varying a first voltage as a predetermined function of the time duration of each element at said predetermined point, comparing said first voltage with a reference voltage during the duration of each element at said predetermined point, indicating by a first signal the reception of a dash whenever a predetermined portion of said first voltage has become equal to said reference voltage during the duration of an element at said point, generating a second signal during the predetermined fixed time delay between the cessation of the reception of an element and the cessation of the element at said point, indicating by a third signal the reception of a dot when a predetermined portion of said first voltage is different from said reference voltage during the duration of an element at said point, using said first dash-indicating signal to obtain a first selected portion of said first voltage, using said second signal to initiate adjustment of the reference voltage in a first direction when said first selected portion of said first voltage is less than said reference voltage, and to initiate adjustment of the reference voltage in a second direction when said first selected portion of said first voltage is more than said reference voltage, using said third dot-indicating signal to obtain a second selected fraction of said first voltage, using said second signal to initiate adjustment of the reference voltage in said first direction when said second selected portion is less than said reference voltage and to initiate adjustment of the reference voltage in said second direction when said second selected portion is more than said reference voltage, and using said adjusted reference voltage for comparison with said first signal during the duration of succeeding elements at said point.

13. The method of automatically identifying as "dots" or "dashes" the marks of a Morse code message and of identifying the different duration spaces occurring between marks comprising the steps of receiving the Morse code message in time sequence, delaying by a predetermined time the arrival of each element at a first point, delaying by the same predetermined time the arrival of each space at a second point, varying first and second time signals as functions of the time duration of each element at said first point and each space at said second point, respectively, generating a first control signal during the predetermined time delay between the cessation of the reception of an element and the cessation of the same element at said point, comparing said first signal with a first reference signal during the duration of each element at said first point, indicating the reception of a dash whenever said first time signal has borne a predetermined relationship to said first reference signal during the duration of an element at said first point, indicating the reception of a dot whenever said first time signal has borne a second predetermined relationship to said first reference signal during the duration of an element at said point, using said dash-indication to obtain a first selected characteristic of said first time signal, using said first control signal to initiate adjusting a characteristic of said first reference signal in a first manner whenever said selected characteristic of said first time signal bears a third predetermined relationship to said first reference signal and in a second manner whenever said selected characteristic bears a fourth predetermined relationship to said first reference signal, using said dot-indication to obtain a second selected characteristic of said first time signal, using said second control signal to initiate adjusting said characteristic of said first reference signal in a first manner whenever said second selected characteristic bears said third predetermined relationship to said first reference signal and in a second manner whenever said first time signal bears said fourth predetermined relationship to said reference signal, indicating the reception of a first kind of space whenever said second time signal has borne said first predetermined relationship to said second reference signal during the duration of a space at said second point, indicating the reception of a second kind of space whenever said second time signal has borne said second predetermined relationship to said second reference signal during the duration of a space at said second point, and using said adjusted first reference signal for comparing with said first time signal during subsequent message reception.

14. The method as claimed in claim 13 and including the steps of generating a second control signal during the predetermined time delay between the cessation of the reception of a space and the cessation of a space at said second point, using the indication of the first kind of space to obtain a third selected characteristic of said second time signal, using said second control signal to initiate adjusting a characteristic of said second reference signal in said first manner whenever said third selected characteristic bears said third predetermined relationship to said second reference signal and in said second manner whenever said third selected characteristic bears said fourth predetermined relationship to said second reference signal, and using said adjusted second reference signal for comparing with said second time signal during subseqent message reception.

15. The method as claimed in claim 14 and including the steps of using the indication of the second kind of space to obtain a fourth selected characteristic of said second time signal, using said second control signal to initiate adjusting said characteristic of said second reference signal in said first manner whenever said fourth selected characteristic bears said third predetermined relationship and in said second manner whenever said fourth selected characteristic bears said fourth predetermined relationship.

16. The method as claimed in claim 13 wherein said second predetermined relationship is the avoidance of said first time signal from said first relationship during the duration of an element at said first point.

17. The method as claimed in claim 15 and wherein said characteristic of said second reference signal is partially controlled by said first reference signal.

18. The method of automatically classifying the marks of a Morse code message as "dots" or "dashes" comprising the steps of receiving the marks of the Morse code message in time sequence, varying a first electrical signal as a predetermined function of the time duration of each element, comparing said first signal with a reference signal during the duration of each element to determine whether each mark is a dot or a dash, and varying said reference signal at the cessation of each mark so that it is a value which effectively corresponds with an average mean value of the first electrical signal during most recent marks.

19. The method of automatically identifying the marks of a Morse code message as "dots" or "dashes" comprising the steps of receiving the marks of the Morse code message in the time sequence, unidirectionally varying a first voltage as a predetermined function of the time duration of each element, comparing said first voltage with a reference voltage during the duration of each element, indicating the reception of a dash whenever a predetermined portion of said first voltage has become equal to said reference voltage during the duration of an element, indicating the reception of a dot whenever said predetermined portion of said varied voltage has remained different from said reference voltage during the duration of an element, and adjusting said reference voltage at the cessation of each mark so that it maintains a value which effectively corresponds to an average mean value of the first voltage at the cessation of the last few marks.

20. The method of automatically classifying the marks of a Morse code message as "dots" or "dashes" and of automatically classifying at least two kinds of spaces which occur between marks comprising the steps of receiving the marks and spaces in time sequence comprising the steps of generating first and second unidirectionally varying voltages as functions of the duration of each mark and space, respectively, comparing said first and second varying voltages with first and second reference voltages, respectively, to determine whether the marks are dots or dashes and whether the spaces are of the first or second kind, adjusting said first reference voltage at the cessation of each mark so that it maintains a value which effectively corresponds to an average mean value of said first varying voltage at the ends of the most recent few marks, and adjusting said second reference voltage at the cessation of each space so that it maintains a value which effectively corresponds to an average mean value of said second varying voltage at the ends of the most recent few spaces.

21. The method as claimed in claim 20 and wherein said Morse code message includes a third kind of space which has a longer duration than either of the other two comprising the steps of comparing a portion of said second varying voltage with said second reference voltage to determine when said third kind of space is received, and preventing any adjustment of said second reference voltage at the cessation of any space of the third kind.

22. The method as claimed in claim 21 and wherein said second reference voltage is maintained equal to at least a portion of said first reference voltage.

23. Apparatus for automatically classifying the electrical marks of a Morse code message into "dots" or "dashes" regardless of changes in message speed comprising an input circuit, an integrator circuit coupled to said input circuit, a voltage-divider circuit coupled to said integrator circuit, an intermediate connection on said voltage-divider circuit, a reference voltage storage circuit, first and second controllable switches, said first switch connecting said reference voltage storage circuit to a second connection on said voltage-divider circuit, said second switch connecting said reference voltage storage circuit to a third connection on said voltage-divider circuit on the opposite side of said intermediate connection from said second connection, a comparison amplifier coupled to said reference voltage storage circuit and coupled to said intermediate connection, and an output circuit coupled to said comparison amplifier, said output circuit being coupled to said switches for controlling said switches.

24. Apparatus as claimed in claim 23 and wherein said output circuit includes a trigger circuit having a pair of outputs, one of said outputs being coupled to said first switch to control the operation of said first switch and the other output being coupled to said second switch to control its operation.

25. Apparatus for automatically classifying the electrical marks of a Morse code message into "dots" or "dashes" regardless of changes in message speed comprising an input circuit, a signal generating circuit generating a signal as a function of the duration of each mark and being coupled to said input circuit, a selecting circuit coupled to said signal generating circuit, a reference signal circuit, first and second controllable switches, said first switch connecting said reference signal circuit to said selecting circuit, said second switch connecting said reference signal circuit to said selecting circuit, a comparison amplifier coupled to said reference signal circuit and coupled to said selecting circuit and an output circuit coupled to said comparison amplifier, said output circuit having connection with said switches for controlling said switches.

26. Apparatus as claimed in claim 24 and including a time-delay circuit in said input circuit having its output coupled to said integrator circuit and feeding the marks to said integrator circuit after a predetermined time delay, said time delay circuit generating a control signal after the cessation of a mark at its input and before the cessation of a mark at its output, and circuit means coupling said control signal to said switches to initiate their operation.

27. Apparatus for automatically classifying the electrical marks of a Morse code message regardless of changes in message speed comprising an input circuit including a pulse squaring trigger circuit, a signal-generating circuit generating a signal as a function of the duration of each mark and being coupled to said trigger circuit, a selecting circuit coupled to said signal-generating circuit and arranged to select three different characteristics of the signal being generated thereby, a reference signal circuit coupled to said selecting circuit and generating a reference signal, a comparison amplifier coupled to said reference signal circuit and coupled to said selecting circuit and arranged to receive one of said three characteristics of said generated signal and to compare it with said reference signal, and an output circuit coupled to said comparison amplifier and coupled to said selecting circuit to control said selecting circuit and to modify said reference signal in accordance with said other two characteristics of the generated signal.

28. Apparatus as claimed in claim 27 and wherein said input includes a time-delay circuit intermediate said trigger circuit and said signal-generating circuit, said time-delay circuit also being connected to said selecting circuit.

29. Apparatus for automatically classifying the marks of a Morse code message and classifying the element spaces and character spaces of the message comprising an input circuit, first and second signal-generators coupled to said signal circuit, said first signal-generator generating a first signal having a characteristic which is a function of the duration of each mark, said second signal-generator generating a second signal having a characteristic which is the function of the duration of each space, first and second selecting circuits connected to said first and second generators, respectively, first and second reference signal circuits respectively coupled to said first and second selecting circuits, first and second comparison circuits respectively coupled to said selecting circuits and to said reference signal circuits, and first and second trigger circuits coupled between said first and second comparison circuits, respectively, and said first and second selecting circuits.

30. Apparatus as claimed in claim 29 and including a third comparison circuit coupled to said second selecting circuit and to said second reference signal circuit, and a third trigger circuit coupled to said second comparison circuit and to said second selecting circuit.

31. Apparatus as claimed in claim 29 and including an inversion circuit in said input circuit coupled to said second signal-generator.

32. Apparatus for automatically generating signals for distinguishing the marks of a Morse code message as being "dots" or "dashes" and for automatically generating signals for distinguishing among the element spaces, character spaces, and word spaces occurring between the marks including an input delay circuit, a first integrator coupled thereto and generating a voltage as a function of the duration of each mark, an inversion circuit coupled to said delay circuit, a second integrator coupled to said inversion circuit and generating a voltage as a function of the duration of each space, first and second voltage-dividers coupled to said first and second integrators, first and second bi-directional switches coupled to said first voltage-divider, third and fourth bi-directional switches coupled to said second voltage-divider, a first control for said first and second switches, a second control for said third and fourth switches, a mark reference voltage storage circuit coupled to said first and second switches, a space reference voltage storage circuit coupled to said third and fourth switches, a first comparison circuit connected to said mark reference voltage storage circuit and to said first voltage-divider for generating signals indicating dashes, means coupling said first comparison circuit to said first and second switches, said delay circuit being coupled to said first and second controls, a second comparison circuit connected to said space reference voltage storage circuit and to said second voltage-divider for generating signals indicating character spaces, means coupling said second comparison circuit to said first and second switches, and a third comparison circuit connected to said space reference voltage storage circuit and to said second voltage divider for generating signals indicating word spaces.

33. Apparatus as claimed in claim 32 and wherein said second control includes a word control suppressor and circuit means coupling said third comparison circuit to said word control suppressor to prevent operation of said switches.

34. Apparatus for converting Morse code into teleprinter code comprising an input circuit, a mark recognition circuit coupled to said input circuit, a space recognition circuit coupled to said input circuit, a letter counter circuit controlled by said space recognition circuit, a single-character storage register having at least six storage means each having alternative conditions and each indicating a dot or a dash in at least six positions, the first of said six storage means being coupled to said mark recognition circuit, advance control means arranged to advance the condition in any storage means into the succeeding storage means, said input circuit being coupled to said advance control means and arranged to actuate said advance control means, a conversion matrix having at least five output connections and being coupled to said storage means and having six input connections each under the control of one of said storage means, a return control circuit for said conversion matrix under the control of said space recognition circuit, a memory circuit having a plurality of rows of memory units under the control of said five output connections, and read-out circuits connected to said memory circuit and adapted to read out from the rows of said memory the information contained therein and to convert said information into teleprinter code signals.

35. Apparatus as claimed in claim 34 and wherein said conversion matrix includes a six output connection responsive to the presence of a dot or a dash condition in the sixth storage means, case shift character generator means under the control of said sixth output connection, and circuit means coupling said case shift character generator to said memory circuit.

36. Apparatus as claimed in claim 35 and wherein said case shift character generator is coupled to the second row of said memory circuit.

37. A conversion matrix for converting a Morse code character into a teleprinter character including at least six pairs of input leads, a plurality of intermediate leads, at least five output leads, a variable impedance connection between predetermined ones of said input leads and said intermediate leads and between predetermined ones of said intermediate leads and said output leads, said output leads each being connected through individual voltage dropping means to a source of voltage, each pair of input leads having no more than one variable impedance connection to any one intermediate lead.

38. A conversion matrix as claimed in claim 37 and wherein every intermediate lead has no more than two variable impedance connections to said output leads.

39. A conversion matrix as claimed in claim 37 and wherein there are seven output leads, the sixth output lead being used to indicate case shift, and the seventh output lead being used to indicate the reception of the special Morse characters $\overline{AR}$, $\overline{BT}$, and $\overline{SK}$.

40. A conversion matrix as claimed in claim 38 and wherein said variable impedance connections are neon bulbs.

41. The method of converting Morse code to teleprinter code suitable for producing page copy comprising the steps of sequentially recognizing "dots" and "dashes" and letter spaces and word spaces, storing the dots and dashes of each Morse character, simultaneously converting each Morse character into a teleprinter character and storing it temporarily in a sequence, counting each letter and word space, generating a word space teleprinter character and storing it temporarily in said sequence at the back end thereof, generating a carriage return and a line-feed character at the recognition of the first word space after a predetermined count has been reached and temporarily storing said characters in said sequence at the back end thereof while simultaneously suppressing the generation of a word space teleprinter character, generating a case shift teleprinter character whenever Morse characters are received requiring a case shift and temporarily storing said case shift character in said sequence ahead of the character requiring said case shift, and converting said stored characters in said sequence from front to back into sequentially transmitted teleprinter characters.

42. The method as claimed in claim 41 wherein said temporarily stored teleprinter characters are automatically advanced from position to position in said sequence and during the conversion into sequentially transmitted characters are shuttled back and forth between the final and preceding positions in said sequence while being shifted laterally one element at a time during each complete shuttle cycle.

43. In a machine for converting Morse code signals to teleprinter code signals, apparatus comprising a memory circuit having a plurality of rows each with capacity for at least five elements of a teleprinter character, advance control means arranged to advance the elements from row to row, carriage return and line feed teleprinter character generator means connected to the first two rows of the memory circuit and case shift teleprinter character means connected to the second row of the memory circuits, and a read out circuit arranged to read the elements of a teleprinter character in sequence from the last row of the memory circuit.

44. In a machine for converting Morse code signals to teleprinter code signals as claimed in claim 43, a case storage transformer, and circuit means connecting said transformer to said case shift teleprinter character means.

45. In a machine for converting Morse code signals to teleprinter code signals as claimed in claim 43, a memory circuit having a plurality of rows, a majority of said rows having five storage units therein, and the last and next-to-last rows each have six storage units.

46. In a Morse-to-teleprinter code conversion machine as claimed in claim 45, a memory read-out circuit connected to said last and next-to-last rows and including two multivibrators, one having a frequency seven times that of the other.

47. Apparatus for converting Morse code to teleprinter code comprising a Morse code input circuit, a mark recognition circuit coupled to said input circuit and arranged to classify the marks of a Morse message as "dots" or "dashes," a More character register circuit coupled to said mark recognition circuit and arranged to store temporarily the dots and dashes of a single Morse character, a conversion matrix coupled to said storage register arranged to convert the Morse character therein to the corresponding teleprinter character, read-out circuits coupled to said matrix, matrix read-out control means coupled to said matrix and to said conversion matrix and arranged to complete a return circuit for said matrix and to actuate said read-out circuits, and a space recognition circuit coupled to said input circuit and generating a letter decision signal at the end of each completed Morse character, said space recognition circuit being coupled to said matrix read-out control means, said matrix read-out control means being actuated by said letter decision pulse.

48. Apparatus for converting Morse code to teleprinter code as claimed in claim 47 and wherein said matrix read-out control means are actuated by the commencement of said letter decision signal and wherein said Morse character storage register includes a reset control circuit arranged to reset the register back to an initial condition, and circuit means connecting said space recognition circuit to said reset control circuit, said reset control circuit being actuated by the cessation of said letter decision pulse, whereby said conversion is made before said Morse character storage register is reset to its initial condition.

49. Apparatus for converting Morse code to teleprinter code as clamed in claim 47 and wherein said matrix read-out control means include a matrix return pulse generator arranged to generate a matrix return pulse of predetermined duration, and a read-out pulse generator generating a read-out pulse which commences after said matrix return pulse has commenced.

50. Apparatus for converting Morse code to teleprinter code as claimed in claim 47 and wherein said Morse character storage register is a binary-type register including at least six pairs of output leads and said matrix includes at least six pairs of input connections coupled to said pairs of Morse character storage register, respectively.

51. Apparatus for automatically converting Morse code to teleprinter code suitable for producing page copy comprising an input circuit, a mark recognition circuit coupled thereto, a Morse character storage circuit coupled to said mark recognition circuit, a conversion matrix coupled to said Morse character storage circuit, memory circuits coupled to said matrix, a space recognition circuit coupled to said input circuit, a letter counter circuit coupled to said space recognition circuit, means generating carriage return and line feed teleprinter characters coupled to said memory circuits, new line control means coupled to said generating means and arranged to actuate said generating means when reverting from a second condition to a first condition and coupled to said letter counter circuit, circuit means coupling said new line control means to said space recognition circuit, said new line control means being placed in its second condition after a predetermined letter count is reached, said new line control means reverting from said second to first conditions when said space recognition circuit recognizes the next word space, whereby said carriage return and line feed generating means is actuated and new line and carriage shift characters are stored in said memory circuits.

52. Apparatus as claimed in claim 51 and wherein said new line control means is a transformer having first and second magnetic conditions.

53. Apparatus as claimed in claim 51 and including a delay circuit coupled to said new line control circuit, circuit means connecting said letter counter to said delay circuit and arranged when a second and higher letter count is reached to actuate said delay circuit and thus to actuate said new line in a manner suitable to initiate operation of said carriage return and line feed character generating means, regardless of the absence of a word space between said two predetermined counts.

54. Apparatus as claimed in claim 53 and wherein said letter counter is arranged to be reset periodically to an initial condition, said generating means being coupled to said letter counter and arranged to reset said letter counter whenever a carriage return character is generated.

55. Apparatus for automatically distinguishing in time sequence between the "dot" marks and "dash" marks of a Morse code message and for accommodating changes in speed of the Morse code message comprising an input circuit, means connected to said input circuit for measuring the time duration of each mark in time sequence, comparison means connected to said time duration measuring means, reference means also connected to said comparison means, control means connected to said reference means for adjusting said reference means, said comparison means being connected to said control means for controlling said adjustment.

56. Apparatus for automatically distinguishing in time sequence between the "dot" marks and "dash" marks and between the element spaces and letter spaces of a Morse code message comprising an input circuit, first measuring means connected to said input circuit for measuring the time duration of marks, second measuring means connected to said input circuit for measuring the time duration of spaces, first and second comparison means, said first and second comparison means being connected to said first and second measuring means, respectively, first and second reference means, said first and second reference means being connected to said first and second comparison means, respectively, and first and second control means connected to said first and second reference means, respectively, for adjustment thereof, said first and second comparison means being connected to said first and second control means for controlling the adjustments of said respective reference means.

References Cited in the file of this patent

UNITED STATES PATENTS

| | | |
|---|---|---|
| 2,228,417 | Spencer | Jan. 14, 1941 |
| 2,467,566 | Potts | Apr. 19, 1949 |
| 2,534,387 | Thomas et al. | Dec. 19, 1950 |
| 2,534,388 | Shenk et al. | Dec. 19, 1950 |
| 2,621,250 | Spencer et al. | Dec. 9, 1952 |
| 2,634,052 | Bloch | Apr. 7, 1953 |
| 2,643,292 | Eliasen et al. | June 23, 1953 |
| 2,678,965 | Ziffer et al. | May 18, 1954 |
| 2,690,474 | Edgar | Sept. 28, 1954 |
| 2,715,718 | Holtje | Aug. 16, 1955 |
| 2,776,418 | Townsend | Jan. 1, 1957 |
| 2,785,304 | Bruce et al. | Mar. 12, 1957 |
| 2,801,334 | Clapper | July 30, 1957 |
| 2,840,637 | McNaney et al. | June 24, 1958 |
| 2,894,067 | Hausman | July 7, 1959 |